US012583130B2

(12) United States Patent
Jung

(10) Patent No.: US 12,583,130 B2
(45) Date of Patent: Mar. 24, 2026

(54) GRIPPER DEVICE FOR ROBOT ARM

(71) Applicant: HANWHA ROBOTICS CORPORATION, Seongnam-si (KR)

(72) Inventor: Hyun Seok Jung, Seoul (KR)

(73) Assignee: HANWHA ROBOTICS CORPORATION, Seongnam-si (KR)

( * ) Notice: Subject to any disclaimer, the term of this patent is extended or adjusted under 35 U.S.C. 154(b) by 979 days.

(21) Appl. No.: 17/778,772

(22) PCT Filed: Nov. 19, 2020

(86) PCT No.: PCT/KR2020/016413
§ 371 (c)(1),
(2) Date: May 20, 2022

(87) PCT Pub. No.: WO2021/101287
PCT Pub. Date: May 27, 2021

(65) Prior Publication Data
US 2022/0410406 A1 Dec. 29, 2022

(30) Foreign Application Priority Data

Nov. 22, 2019 (KR) ........................ 10-2019-0151618
Feb. 10, 2020 (KR) ........................ 10-2020-0015660

(51) Int. Cl.
B25J 15/02 (2006.01)
B25J 19/00 (2006.01)
(Continued)

(52) U.S. Cl.
CPC ......... B25J 15/024 (2013.01); B25J 19/0091 (2013.01); B25J 19/02 (2013.01); B25J 15/10 (2013.01)

(58) Field of Classification Search
CPC ...... B25J 15/024; B25J 15/10; B25J 19/0091; B25J 19/02; B25J 17/0225
See application file for complete search history.

(56) References Cited

U.S. PATENT DOCUMENTS

| | | | | |
|---|---|---|---|---|
| 5,326,369 A | * | 7/1994 | Schectman | A61F 2/586 623/64 |
| 5,762,390 A | * | 6/1998 | Gosselin | B25J 15/0009 901/33 |

(Continued)

FOREIGN PATENT DOCUMENTS

| | | |
|---|---|---|
| CN | 107053242 A | 8/2017 |
| CN | 107511837 A | 12/2017 |

(Continued)

OTHER PUBLICATIONS

Communication dated Jul. 6, 2023 issued by the Korean Intellectual Property Office in counterpart Korean Application No. 10-2020-0015660.

(Continued)

*Primary Examiner* — Stephen A Vu
(74) *Attorney, Agent, or Firm* — Sughrue Mion, PLLC

(57) ABSTRACT

According to an aspect of the disclosure, a robot arm gripper device includes a grip unit capable of gripping an object by a hinge movement, a power transmission unit coupled to the grip unit and transmitting power to the grip unit, and a buffer unit having one side connected to the power transmission unit and another side connected to a robot arm body, wherein the power transmission unit is movable on the buffer unit.

20 Claims, 19 Drawing Sheets

(51) Int. Cl.
  B25J 19/02    (2006.01)
  B25J 15/10    (2006.01)

(56)          References Cited

U.S. PATENT DOCUMENTS

| | | | |
|---|---|---|---|
| 8,303,007 | B2 | 11/2012 | Fukano et al. |
| 9,533,419 | B1 * | 1/2017 | Strauss ................ B25J 15/0009 |
| 9,643,323 | B2 | 5/2017 | Nagatsuka et al. |
| 9,744,675 | B1 | 8/2017 | Hsieh et al. |
| 2010/0156125 | A1 * | 6/2010 | Lee ...................... B25J 15/0009 |
| | | | 901/32 |
| 2019/0030711 | A1 * | 1/2019 | Azazi ........................ B25J 15/10 |
| 2019/0329424 | A1 | 10/2019 | Matsuo |
| 2020/0017317 | A1 * | 1/2020 | Yap ......................... G06Q 10/08 |

FOREIGN PATENT DOCUMENTS

| | | | |
|---|---|---|---|
| JP | 05-192887 | A | 8/1993 |
| JP | 201497546 | A | 5/2014 |
| JP | 2019-188560 | A | 10/2019 |
| KR | 20000026826 | A * | 5/2000 |
| KR | 1020000026826 | A | 5/2000 |
| KR | 10-2008-0082305 | A | 9/2008 |
| KR | 10-2010-0138481 | A | 12/2010 |
| KR | 10-1009290 | B1 | 1/2011 |
| KR | 10-2018-0114673 | A | 10/2018 |

OTHER PUBLICATIONS

Communication dated Jan. 16, 2023 issued by the Korean Patent Office in application No. 10-2019- 0151618.

International Search Report (PCT/ISA/210) dated Feb. 3, 2021, issued by the International Searching Authority in counterpart International Application No. PCT/KR2020/016413.

Written Opinion (PCT/ISA/237) dated Feb. 3, 2021, issued by the International Searching Authority in counterpart International Application No. PCT/KR2020/016413.

Communication dated Feb. 8, 2024, issued by the European Patent Office in counterpart European Application No. 20891072.9.

Communication dated Nov. 20, 2023, issued by European Patent Office in European Patent Application No. 20891072.9.

* cited by examiner

GRIPPER DEVICE FOR ROBOT ARM

CROSS-REFERENCE TO RELATED APPLICATIONS

This application is a National Phase Entry of PCT International Application No. PCT/KR2020/016413, filed on Nov. 19, 2020, which claims priority to Korean Patent Application No. 10-2019-0151618 filed on Nov. 22, 2019, and Korean Patent Application No. 10-2020-0015660 filed on Feb. 10, 2020, the disclosures of which are incorporated herein in their entireties by reference.

TECHNICAL FIELD

Embodiments of the disclosure relate to a robot arm gripper device, and more particularly, to a robot arm gripper device capable of efficiently gripping an atypical object while buffering an impact.

BACKGROUND ART

In general, a robot arm is mainly used for the purpose of automating product production in industrial sites such as manufacturing production lines. A gripper for gripping an article is generally installed at the front end of a robot arm installed in a production line, and the shape and function of the gripper vary depending on the gripped article and the operation content.

There has been a problem in that the operation efficiency degrades significantly due to a collision with a protrusion portion in a site where articles are loaded and being caught when moving to a place where a plurality of objects are randomly stacked.

A robot arm is disclosed in Chinese Patent Publication No. 107053242 (published on Aug. 18, 2017, Title of Disclosure: Robot bionic gripper).

DESCRIPTION OF EMBODIMENTS

Technical Problem

The disclosure is to provide a robot arm gripper device capable of stably gripping atypical objects such as bearings, electronic parts, or processed parts.

Also, the disclosure is to prevent damage by buffering an impact caused by a collision occurring at an operation site or an atypical object because a power transmission unit is movable on a buffer unit.

Also, the disclosure is to provide a robot arm gripper device capable of efficiently gripping an object and avoiding an abrupt collision with a site terrain or object because a buffer unit is relatively rotatable with respect to a robot arm body.

However, these problems are merely examples and the scope of the disclosure is not limited thereto.

Solution to Problem

According to an aspect of the disclosure, a robot arm gripper device includes: a grip unit capable of gripping an object by a hinge movement; a power transmission unit coupled to the grip unit and transmitting power to the grip unit; and a buffer unit having one side connected to the power transmission unit and another side connected to a robot arm body, wherein the power transmission unit is movable on the buffer unit.

Also, according to another aspect of the disclosure, a robot arm gripper includes: a robot arm body; a grip unit capable of gripping an object by a hinge movement; a power transmission unit coupled to the grip unit and transmitting power to the grip unit; and a buffer unit having one side connected to the power transmission unit and another side connected to the robot arm body, wherein the buffer unit is capable of relative rotation with respect to the robot arm body.

Advantageous Effects of Disclosure

According to an embodiment of the disclosure, an atypical object may be stably gripped due to a grip unit hinged by receiving power from a power transmission unit.

Also, according to an embodiment of the disclosure, an impact caused by an unexpected collision in an atypical object, an operation environment, or a surrounding environment may be buffered because a power transmission unit coupled to a grip unit moves on a buffer unit.

Also, according to an embodiment of the disclosure, an abrupt collision with an object loaded in an external terrain or site may be avoided and damage caused by the collision may be prevented because a buffer unit rotates relatively with respect to a robot arm body.

Also, according to an embodiment of the disclosure, because a sensor unit measures the elastic force of a buffer unit, a collision and damage caused by the collision may be prevented by controlling the driving of a robot arm body when an excessive force is applied by an object loaded in an external terrain or site.

BEST MODE

Figure 1:
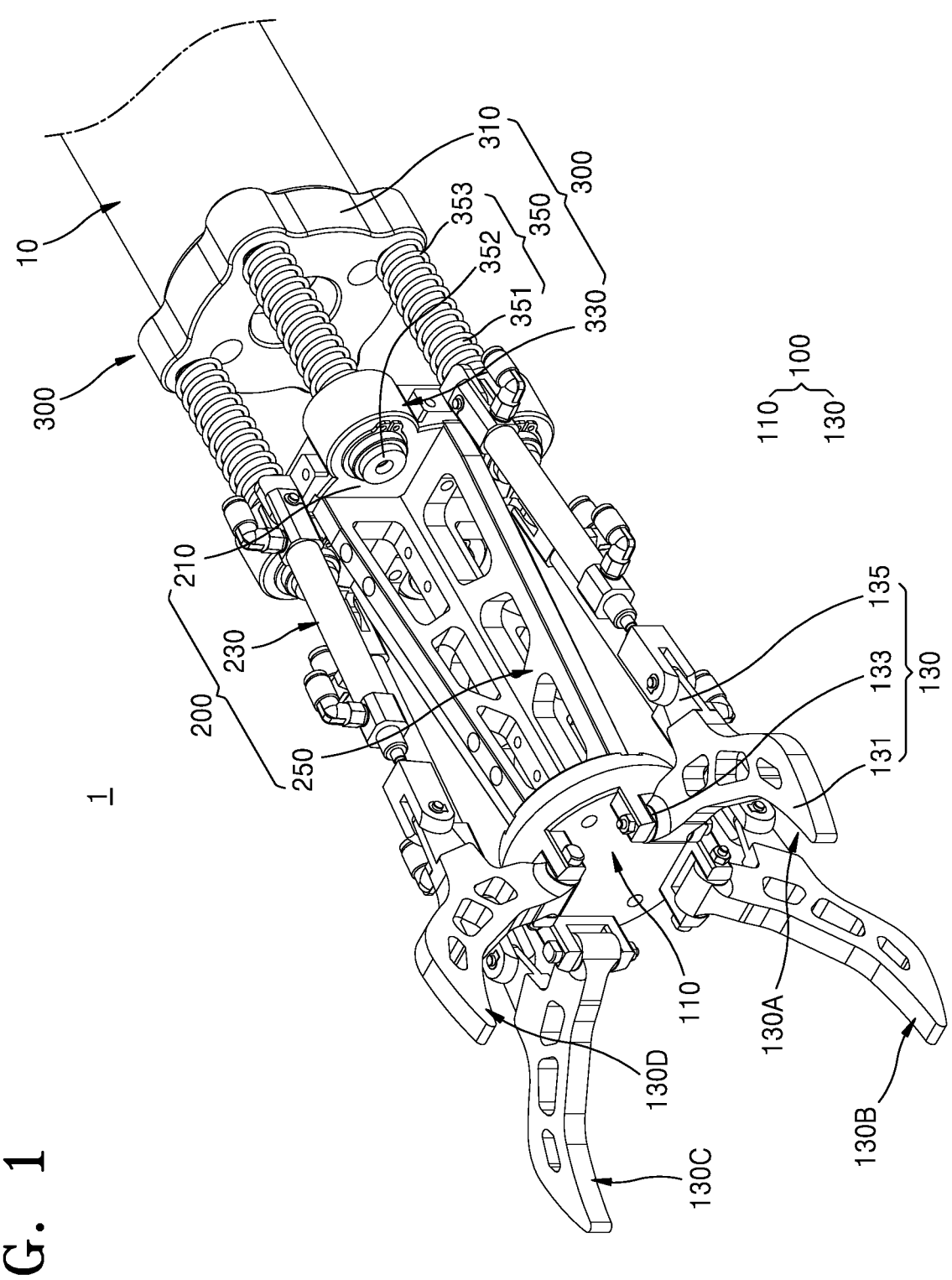
FIG. 1 is a perspective view illustrating a robot arm gripper device according to an embodiment of the disclosure.

According to an aspect of the disclosure, a robot arm gripper device includes: a grip unit capable of gripping an object by a hinge movement; a power transmission unit coupled to the grip unit and transmitting power to the grip unit; and a buffer unit having one side connected to the power transmission unit and another side connected to a robot arm body, wherein the power transmission unit is movable on the buffer unit.

Herein, the grip unit may include: a grip base coupled to the power transmission unit and fixed in position; and a grip body hingeably connected to the grip base by receiving power from the power transmission unit.

Herein, the grip body may include at least one bent portion on another side facing one side connected to the grip base.

Herein, the grip body may include a first connection unit hinge-coupled to the grip base and a second connection unit arranged apart from the first connection unit and rotating the grip body by receiving power from the power transmission unit.

Herein, the grip unit may further include a grip shoe attached to the grip body.

Herein, the power transmission unit may include: a power transmission base arranged to face the grip base and movable on the buffer unit; and a driving unit coupled to each of the power transmission base and the grip body and adjustable in length.

Herein, the driving unit may be adjusted in length by a hydraulic or pneumatic cylinder method and may transmit power to the grip body.

Herein, the driving unit may be hinge-coupled to the power transmission base.

Herein, the power transmission unit may further include a support unit connecting the grip base and the power transmission base and contacting and supporting the grip base and the power transmission base.

Herein, the buffer unit may include: a buffer base connected to the robot arm body; a moving unit coupled to the power transmission unit and capable of reciprocating in a direction of the buffer base; and a buffer body arranged between the buffer base and the moving unit and elastically supporting the moving unit.

Herein, the buffer unit may be rotatably coupled to the robot arm body with a longitudinal central axis of the robot arm body as a rotation center.

Also, according to another aspect of the disclosure, a robot arm gripper includes: a robot arm body; a grip unit capable of gripping an object by a hinge movement; a power transmission unit coupled to the grip unit and transmitting power to the grip unit; and a buffer unit having one side connected to the power transmission unit and another side connected to the robot arm body, wherein the buffer unit is capable of relative rotation with respect to the robot arm body.

Herein, the buffer unit may include a buffer base connected to the robot arm body, and the buffer base may be relatively rotatably coupled to the robot arm body with a longitudinal central axis of the robot arm body as a rotation center.

Herein, the robot arm gripper device may further include a first elastic member arranged between the buffer base and the robot arm body and having an elastic restoration force.

Herein, the buffer unit may further include: a moving unit coupled to the power transmission unit and capable of reciprocating in a direction of the buffer base; and a buffer body arranged between the buffer base and the moving unit and elastically supporting the moving unit.

Herein, the robot arm gripper device may further include a sensor unit installed in the buffer unit and measuring an elastic force of the buffer body.

Herein, the robot arm gripper device may further include a second elastic member arranged between the power transmission unit and the grip unit and elastically supporting the grip unit.

Other aspects, features, and advantages other than those described above will become apparent from the accompanying drawings, the appended claims, and the detailed description of the disclosure.

MODE OF DISCLOSURE

The disclosure may include various embodiments and modifications, and certain embodiments thereof are illustrated in the drawings and will be described herein in detail. The advantages and features of the disclosure and the accomplishing methods thereof will become apparent from the embodiments described below in detail with reference to the accompanying drawings. However, the present disclosure is not limited to the embodiments described below, and may be embodied in various modes.

Hereinafter, embodiments of the disclosure will be described in detail with reference to the accompanying drawings, and in the following description, like reference numerals will denote like elements and redundant descriptions thereof will be omitted.

It will be understood that although terms such as "first" and "second" may be used herein to describe various elements, these elements should not be limited by these terms and these terms are only used to distinguish one element from another element.

As used herein, the singular forms "a", "an", and "the" are intended to include the plural forms as well, unless the context clearly indicates otherwise.

Also, it will be understood that the terms "comprise," "include," and "have" used herein specify the presence of stated features or elements, but do not preclude the presence or addition of one or more other features or elements.

Sizes of elements in the drawings may be exaggerated for convenience of description. In other words, because the sizes and shapes of components in the drawings are arbitrarily illustrated for convenience of description, the disclosure is not limited thereto.

Figure 2:
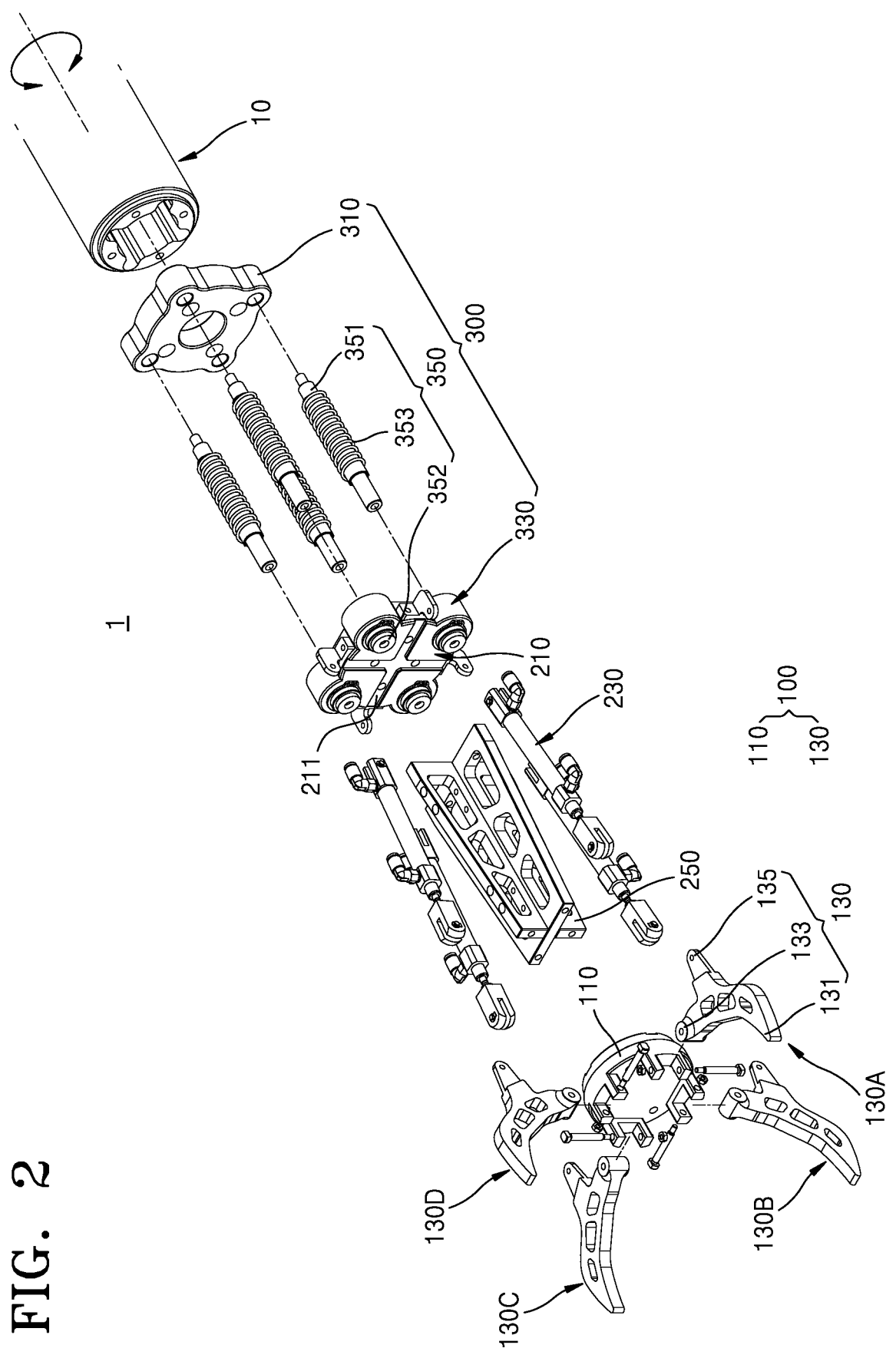
FIG. 2 is an exploded perspective view illustrating a robot arm gripper device according to an embodiment of the disclosure.
Figure 3A:
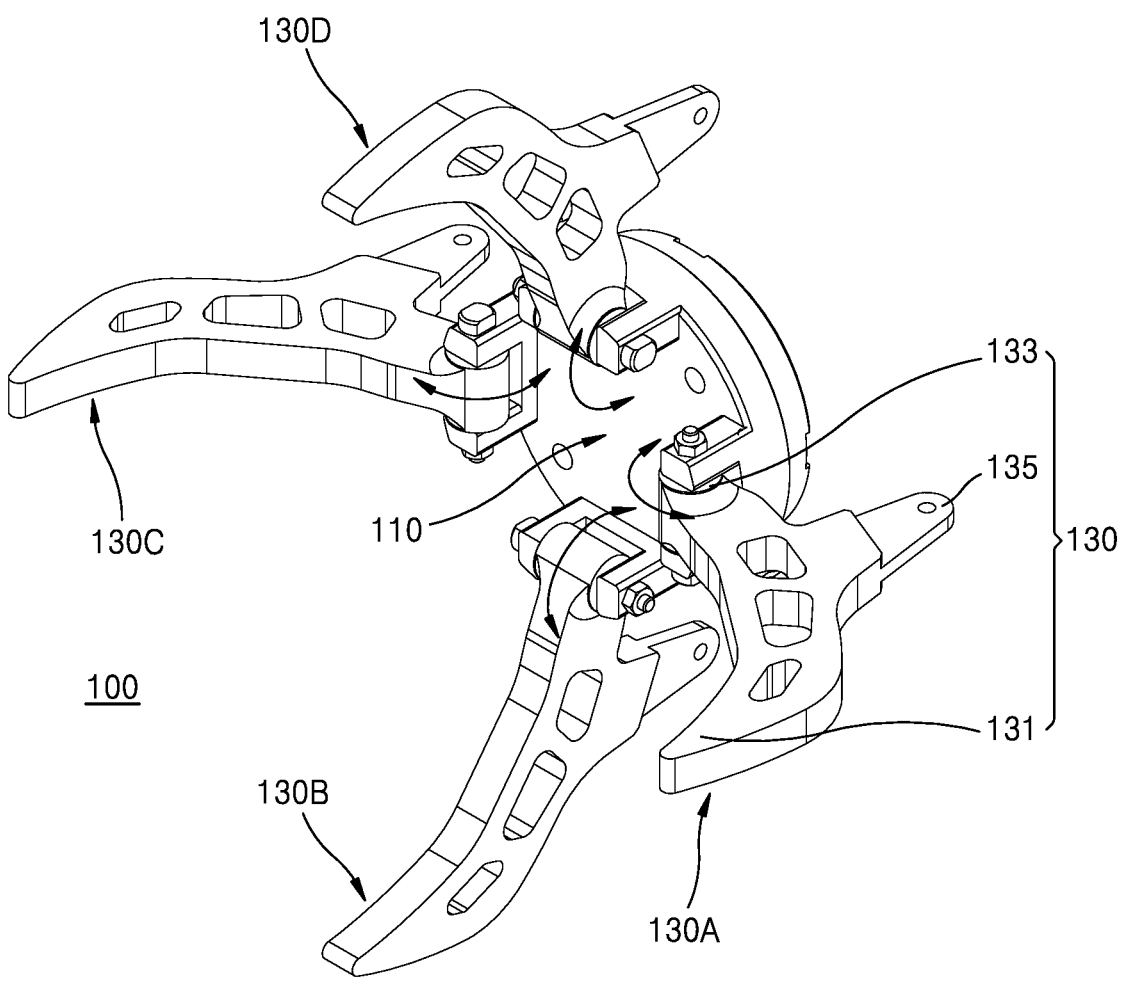
FIG. 3A is a perspective view illustrating a grip unit according to an embodiment of the disclosure.
Figure 3B:
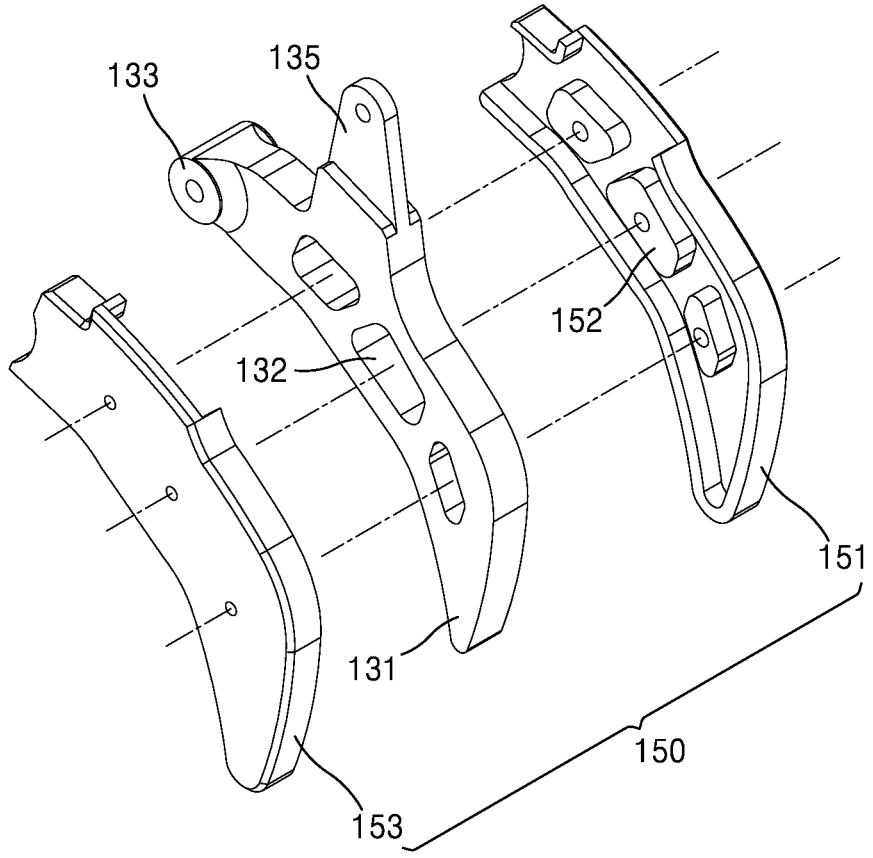
FIG. 3B is a view illustrating a grip body and a grip shoe according to an embodiment of the disclosure.
Figure 4A:
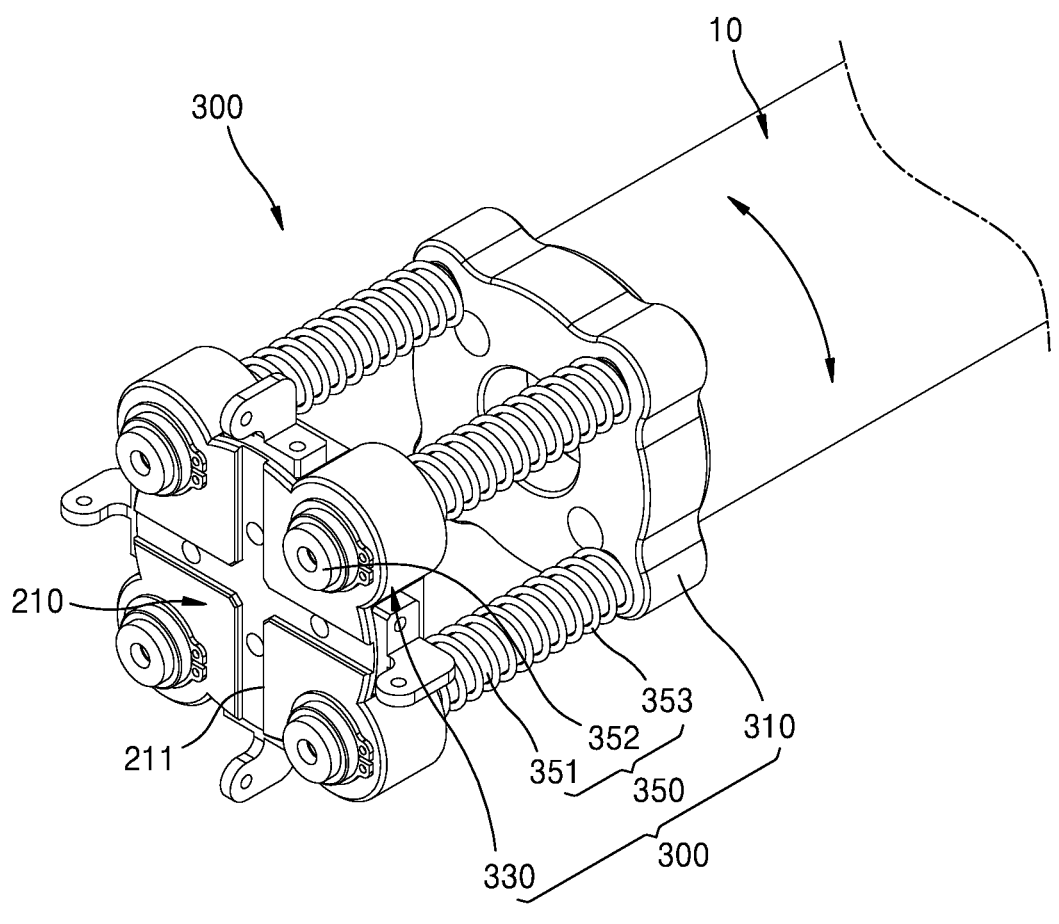
FIGS. 4A and 4B are perspective views illustrating a buffer unit according to an embodiment of the disclosure.
Figure 4B:
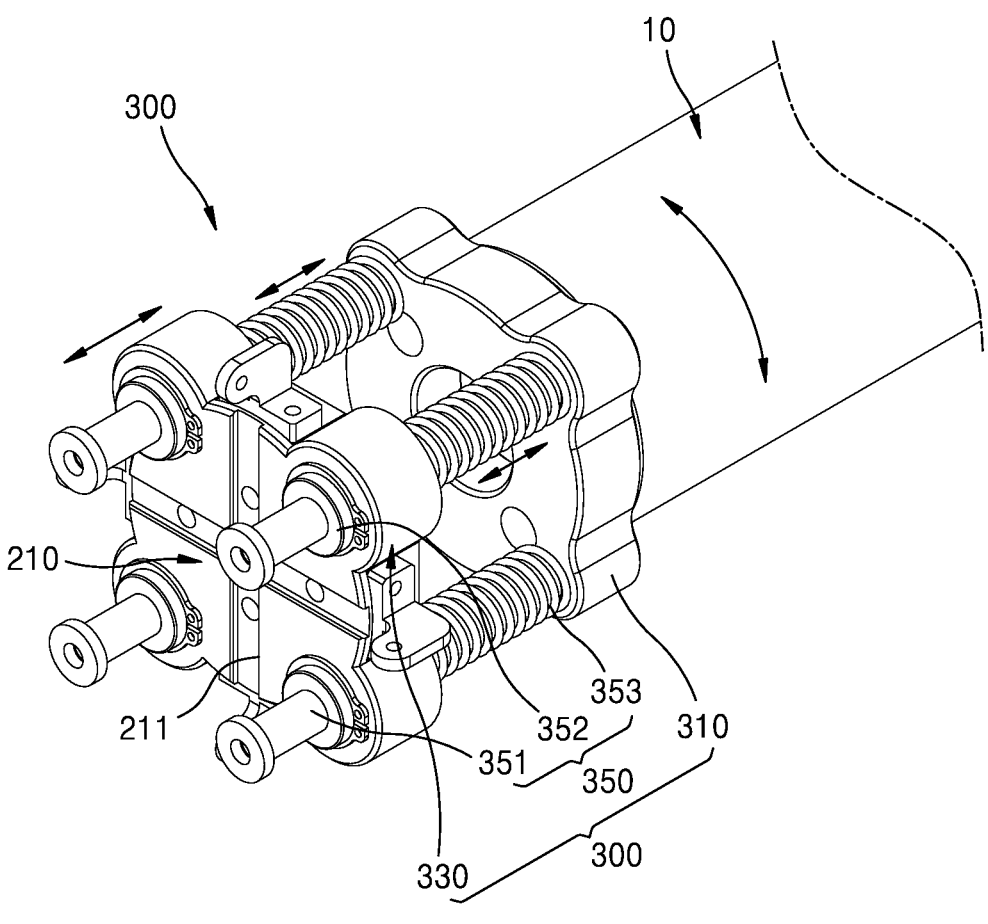

Hereinafter, robot arm gripper devices according to embodiments of the disclosure will be described with reference to the accompanying drawings. FIG. 1 is a perspective view illustrating a robot arm gripper device according to an embodiment of the disclosure. FIG. 2 is an exploded perspective view illustrating a robot arm gripper device according to an embodiment of the disclosure. FIG. 3A is a perspective view illustrating a grip unit according to an embodiment of the disclosure. FIG. 3B is a view illustrating a grip body and a grip shoe according to an embodiment of the disclosure. FIGS. 4A and 4B are perspective views illustrating a buffer unit according to an embodiment of the disclosure.

Referring to FIGS. 1 to 4A and 4B, a robot arm gripper device 1 according to an embodiment of the disclosure may include a grip unit 100, a power transmission unit 200, and a buffer unit 300.

Referring to FIGS. 1 to 3A, the grip unit 100 according to an embodiment of the disclosure may be capable of gripping an object 5 by a hinge movement, may be coupled to the power transmission unit 200 described below, and may receive power from the power transmission unit 200.

Referring to FIG. 3A, the grip unit 100 according to an embodiment of the disclosure may include a grip base 110 and a grip body 130. The grip base 110 may be coupled to the power transmission unit 200 and may be coupled to the power transmission unit 200, particularly a support unit 250, to be fixed in position.

The grip base 110 may be arranged to face the power transmission unit 200, particularly a power transmission base 210.

At least one grip body 130 (130A, 130B, 130C, and 130D) described below may be hingeably coupled to the grip base 110.

The grip body 130 coupled to the grip base 110 fixed in position to the power transmission unit 200 may be hinged in the clockwise or counterclockwise direction with a point coupled to the grip base 110 as a rotation center by receiving power from a driving unit 230.

Referring to FIGS. 1 and 3A, the grip base 110 according to an embodiment of the disclosure may be formed in a circular shape; however, the disclosure is not limited thereto and the grip base 110 may be variously modified such as being formed in a polygonal shape.

Referring to FIGS. 1 to 3A, the grip body 130 according to an embodiment of the disclosure may receive power from the power transmission unit 200 and may be hingeably connected to the grip base 110.

Referring to FIGS. 1 to 3A, the grip body 130 according to an embodiment of the disclosure may be provided as at least one grip body. A plurality of grip bodies 130A, 130B, 130C, and 130D may be conformally arranged with respect to the center of the grip base 110.

Referring to FIG. 3A, in the disclosure, the grip body 130 is provided as four grip bodies 130A, 130B, 130C, and 130D; however, the disclosure is not limited thereto and the grip body 130 may be variously modified such as being provided as two, three, five or more grip bodies hingeably coupled to the grip base 110.

Referring to FIG. 3A, in the grip body 130 according to an embodiment of the disclosure, at least one bent portion 131 may be formed on the other side facing one side connected to the grip base 110.

Particularly, the bent portion 131 may be bent toward a center portion of the grip base 110, that is, in an inward direction.

Accordingly, when the other sides facing one side connected to the grip base 110 in a plurality of grip bodies 130 are hinged in the direction of gathering together by receiving power from the power transmission unit 200, they may be gathered at a preset point.

Also, by making a hinge movement by selectively applying power among a plurality of grip bodies 130 (130A, 130B, 130C, and 130D) depending on the shape or type of an object to be gripped, more various objects may be easily gripped.

In addition, because the bent portion 131 is formed in the grip body 130, it may be effectively caught on an atypical object 5 such as a processed part, an electronic part, or a bearing having a ring shape.

In addition, when the robot arm gripper device 1 moves in a state where the object 5 is caught on the grip body 130, the object 5 may be prevented from being separated from the grip body 130.

The bent portion 131 according to an embodiment of the disclosure may have different curvature radiuses and may be variously modified such as being provided as at least one bent portion in the direction in which the bent portion 131 extends, particularly from one side hingeably-coupled to the grip base 110 to the other side facing the one side.

Referring to FIG. 3A, the shape and effect of the bent portion 131 is formed and implemented in the grip body 130; however, the disclosure is not limited thereto and it may be variously modified such as being implemented by a grip shoe 150 attached to the grip body 130 as illustrated in FIG. 3B.

Referring to FIG. 3B, the grip unit 100 according to an embodiment of the disclosure may include a grip shoe 150.

The grip shoe 150 according to an embodiment of the disclosure may be attached to the grip body 130 and may be arranged outside the grip body 130.

Referring to FIG. 3B, the grip shoe 150 may include a first shoe body 151 and a second shoe body 153. The first shoe body 151 and the second shoe body 153 may be arranged to face each other and may be attached to the outer circumferential surface of the grip body 130.

On the first shoe body 151 according to an embodiment of the disclosure, a protrusion portion 152 may be formed to protrude in a direction toward the second shoe body 153.

At least one hole 132 may be formed in the grip body 130, and at least one protrusion portion 152 may be provided to correspond to the at least one hole 132.

The protrusion portion 152 may pass through the hole 132 formed in the grip body 130 and may contact the second shoe body 153.

A separate fastening member (not assigned a reference numeral) may fasten the second shoe body 153 and the protrusion portion 152. Accordingly, the first shoe body 151 and the second shoe body 153 may be coupled to each other and may be prevented from being separation from the grip body 130.

In the disclosure, the protrusion portion 152 is formed on the first shoe body 151; however, it may be variously modified such as protruding from one surface of the second shoe body 153 toward the first shoe body 151.

Referring to FIG. 3B, the grip shoe 150 according to an embodiment of the disclosure may be formed of a rubber material or the like and may improve a gripping force on the object 5 due to friction with the object 5.

In addition, the grip shoe 150 may be formed of a different material than the grip body 130, for example, a material such as rubber, may prevent damage to the object 5 having lower strength than the grip body 130, and may allow stable gripping.

In the grip shoe 150 according to an embodiment of the disclosure, the first shoe body 151 and the second shoe body 153 are arranged to face each other and the protrusion portion 152 formed to protrude from the inner circumferential surface of the first shoe body 151 passes through the hole 132 formed in the grip body 130 for coupling thereof; however, the disclosure is not limited thereto and it may be variously modified such as being attached to the grip body 130 in a coated manner.

Also, it may be variously modified such as a groove being formed in a certain area along the outer circumferential surface of the grip body 130 and a grip shoe being installed in the groove.

Referring to FIGS. 2 and 3A, a first connection unit 133 and a second connection unit 135 may be formed in the grip body 130 according to an embodiment of the disclosure.

The first connection unit 133 may be hinge-coupled to the grip base 110, and the second connection unit 135 may receive power from the power transmission unit 200 to rotate the grip body 130 by allowing the grip body 130 to be hinged with respect to the grip base 110.

The first connection unit 133 and the second connection unit 135 according to an embodiment of the disclosure may be formed to be spaced apart from each other, and a connection portion between the grip base 110 and the first connection unit 133 formed in the grip body 130 may function as a rotational central axis of the grip body 130.

With respect to the rotational central axis, the grip body 130 may be hinged with respect to the grip base 110 in the clockwise or counterclockwise direction.

Referring to FIG. 3A, the second connection unit 135 may be arranged outside the first connection unit 133, and the second connection unit 135 may move in a linear direction when receiving power from the power transmission unit 200, particularly the driving unit 230.

Due to the first connection unit 133 formed in the grip body 130 according to an embodiment of the disclosure, the second connection unit 135 may convert a linear movement received from the driving unit 230 into a hinge movement with respect to the grip base 110.

Referring to FIG. 3A, the first connection unit 133 and the second connection unit 135 according to an embodiment of the disclosure may be formed in each of a plurality of grip bodies 130.

A plurality of first connection units 133 may be hinged in the clockwise or counterclockwise direction by using a connection portion with the grip base 110 as a rotational central axis.

Referring to FIG. 3A, the first connection unit 133 according to an embodiment of the disclosure may be rotatably coupled to the grip base 110 through a fastening member (not assigned a reference numeral). The fastening member may be coupled through an overlapping area of the first connection unit 133 and the grip base 110.

Referring to FIG. 3A, the second connection unit 135 according to an embodiment of the disclosure may be coupled to the driving unit 230 through a fastening member (not assigned a reference numeral). The fastening member may be coupled through an overlapping area of the second connection unit 135 and the driving unit 230.

In the grip body 130 according to an embodiment of the disclosure, one end area where the bent portion 131 is formed may be variously modified such as being formed in a planar shape, a sawtooth shape, or a spherical shape.

Referring to FIGS. 1, 2, 4A, and 4B, the power transmission unit 200 according to an embodiment of the disclosure may be coupled to the grip unit 100 and may transmit power to the grip unit 100.

Referring to FIGS. 1, 2, 4A, and 4B, the power transmission unit 200 according to an embodiment of the disclosure may include a power transmission base 210, a driving unit 230, and a support unit 250.

Referring to FIGS. 1, 2, 4A, and 4B, the power transmission base 210 according to an embodiment of the disclosure may be arranged to face the grip base 110 and may move on the buffer unit 300.

Referring to FIGS. 2, 4A, and 4B, the power transmission base 210 may be coupled to a moving unit 330 described below.

In the disclosure, the power transmission base 210 and the moving unit 330 may be independently provided and coupled to each other; however, the disclosure is not limited thereto and they may be variously modified such as being integrally formed.

A hole portion (not assigned a reference numeral) may be formed in the power transmission base 210. The buffer unit 300 described below, particularly a guide shaft 351, may be coupled through the hole portion.

The power transmission base 210 according to an embodiment of the disclosure may move along the longitudinal axis of the guide shaft 351 on the guide shaft 351 together with the moving unit 330.

A support groove 211 may be formed in the shape of a groove portion on one surface (the left surface in FIG. 4A) of the power transmission base 210 facing the grip base 110. The support unit 250 described below may be seated in the support groove 211.

Referring to FIGS. 2 and 4A, because the support unit 250 is seated in the support groove 211 formed in the power transmission base 210 according to an embodiment of the disclosure, the distance between the power transmission base 210 and the grip base 110 may be constantly maintained by the length of the support unit 250.

In addition, because the support unit 250 is seated in the support groove 211, the support unit 250 may be prevented from moving on the power transmission base 210.

Referring to FIGS. 2 and 4A, in the disclosure, the support groove 211 may be formed on one surface of the power transmission base 210 facing the grip base 110.

However, the disclosure is not limited thereto and it may be variously modified such as being formed on one surface of the grip base 110 facing one surface of the power transmission base 210 where the support groove 211 is formed.

Referring to FIGS. 1 and 2, the driving unit 230 according to an embodiment of the disclosure may be coupled to each of the power transmission base 210 and the grip body 130 and may be adjusted in length.

The driving unit 230 according to an embodiment of the disclosure may be lengthened or shortened by receiving power from the outside. The driving unit 230 may move linearly in the longitudinal direction.

The driving unit 230 according to an embodiment of the disclosure may receive a fluid or gas having a preset pressure from the outside through a flow path (not assigned a reference numeral).

The driving unit 230 according to an embodiment of the disclosure may be adjusted in length by a hydraulic or pneumatic cylinder method and may transmit power to the grip body 130.

Because the driving unit 230 according to an embodiment of the disclosure is formed by a hydraulic or pneumatic cylinder method, the driving unit 230 may be lengthened or shortened by a hydraulic or pneumatic pressure and may transmit power to the grip body 130.

In the disclosure, the driving unit 230 moves linearly and is adjusted in length; however, the disclosure is not limited thereto and it may be variously modified such as transmitting power in a motor method such that the grip body 130 may hingeably transmit power to the grip base 110.

Referring to FIG. 1, one side (the left side in FIG. 1) of the driving unit 230 may be connected to the second connection unit 135 formed in the grip body 130, and the other side (the right side in FIG. 1) facing the one side may be coupled to the power transmission base 210.

The driving unit 230 according to an embodiment of the disclosure may be hingeably coupled to the outer circumferential surface of the power transmission base 210.

Accordingly, when the driving unit 230 is adjusted in length and transmits power to the grip body 130, flexibility may be secured such that the driving unit 230 may be hinged with a preset point as a rotation center on the outer circumferential surface of the power transmission base 210.

The driving unit 230 according to an embodiment of the disclosure may be provided as at least one driving unit to correspond to the grip body 130 provided as at least one grip body.

Although not illustrated in the drawings, at least one driving unit 230 may be independently controlled by receiving an electrical signal from a controller.

Accordingly, the length adjustment due to the driving of at least one driving unit 230 may be formed differently, and the object 5 may be efficiently gripped in various environments.

Referring to FIGS. 1 and 2, the support unit 250 according to an embodiment of the disclosure may connect the grip base 110 and the power transmission base 210 and may contact and support the grip base 110 and the power transmission base 210.

Referring to FIGS. 1 and 2, the support unit 250 according to an embodiment of the disclosure may be provided as at least one support unit, and a plurality of support units 250 may be arranged to intersect each other.

Referring to FIG. 2, the support unit 250 according to an embodiment of the disclosure may be formed to extend in the longitudinal direction, and a cross-section thereof in a direction perpendicular to the longitudinal central axis may be formed in a '+' shape.

Accordingly, the support unit 250 may surface-contact each of the power transmission base 210 and the grip base 110 and may stably support the same.

In the disclosure, the cross-section of the support unit 250 with respect to the longitudinal central axis is formed in a '+' shape; however, the disclosure is not limited thereto and it may be variously modified such as surface-contacting the grip base 110 and the power transmission base 210.

Referring to FIGS. 1 and 2, the support unit 250 according to an embodiment of the disclosure may be seated in the support groove 211 formed on one surface of the power transmission base 210 facing the support unit 250.

Accordingly, the support unit 250 may be prevented from moving on the power transmission base 210 and the support unit 250 may be stably coupled to the power transmission base 210.

Although not illustrated in the drawings, the support unit 250 and the power transmission base 210 may be fastened by a fastening member (not illustrated).

In the disclosure, the support unit 250 is seated in the support groove 211 formed in the power transmission base 210; however, the disclosure is not limited thereto and it may be variously modified such as being seated in a groove formed in the grip base 110 facing the support unit 250.

Although not illustrated in the drawings, the support unit 250 and the grip base 110 may be fastened by a fastening member (not illustrated).

Referring to FIGS. 1, 2, and 4A, one side of the buffer unit 300 according to an embodiment of the disclosure may be connected to the power transmission unit 200, and the other side thereof facing the one side may be connected to a robot arm body 10.

The buffer unit 300 according to an embodiment of the disclosure is the object 5 or the surrounding environment may buffer an impact applied to the grip unit 100 due to a collision with the object 5 or the surrounding environment when the grip unit 100 performs an operation of gripping an atypical object 5 such as a processed part, an electronic component, or a ring-shaped bearing.

Referring to FIGS. 2, 4A, and 4B, the buffer unit 300 according to an embodiment of the disclosure may include a buffer base 310, a moving unit 330, and a buffer body 350.

The buffer base 310 according to an embodiment of the disclosure may be connected to the robot arm body 10 and may be moved together as the robot arm body 10 is driven and moved by receiving power from the outside.

Referring to FIGS. 2 and 4A, the buffer body 350 described below may be coupled to the buffer base 310 according to an embodiment of the disclosure. The buffer base 310 may be arranged to face the moving unit 330 with the buffer body 350 therebetween.

The distance between the buffer base 310 and the moving unit 330 may increase or decrease as the moving unit 330 moves on the buffer body 350.

Referring to FIGS. 1, 2, 4A, and 4B, the moving unit 330 according to an embodiment of the disclosure may be coupled to the power transmission unit 200 and may reciprocate in the direction of the buffer base 310 (the horizontal direction in FIG. 4A).

Referring to FIG. 4A, the other surface of the moving unit 330 facing one surface thereof facing the buffer base 310 may be coupled to the power transmission base 210.

In the disclosure, the moving unit 330 and the power transmission base 210 are separately formed and coupled; however, the disclosure is not limited thereto and the moving unit 330 and the power transmission base 210 may be variously modified such as being integrally formed.

Referring to FIGS. 2 and 4A, a hole portion (not assigned a reference numeral) may be formed in the moving unit 330 according to an embodiment of the disclosure. The guide shaft 351 described below may be coupled through the hole portion formed in the moving unit 330.

Because the guide shaft 351 is coupled through the hole portion formed in the moving unit 330, the moving unit 330 may move along the guide shaft 351 and the distance between the buffer base 310 and the moving unit 330 may be adjusted.

Referring to FIGS. 4A and 4B, a shaft head 352 described below may be coupled to the moving unit 330 according to an embodiment of the disclosure, and the cross-sectional area of the shaft head 352 may be relatively greater than the diameter of the hole portion formed in the moving unit 330.

In addition, the cross-sectional area of the shaft head 352 may be relatively greater than the diameter of the hole portion formed in the power transmission base 210 coupled to the moving unit 330.

Accordingly, the moving unit 330 moving on the guide shaft 351 and the power transmission base 210 coupled to the moving unit 330 may be prevented from separating outside the guide shaft 351, and a coupling structure of the moving unit 330 and the power transmission base 210 may move stably on the guide shaft 351.

Referring to FIGS. 1, 2, 4A, and 4B, the buffer body 350 according to an embodiment of the disclosure may be arranged between the buffer base 310 and the moving unit 330 and may elastically support the moving unit 330.

Referring to FIGS. 4A and 4B, the buffer body 350 according to an embodiment of the disclosure may include a guide shaft 351, a shaft head 352, and a third elastic member 353.

The guide shaft 351 may be coupled to the buffer base 310 and may pass through the moving unit 330 and the power transmission base 210.

The guide shaft 351 may be provided as at least one guide shaft, and a plurality of guide shafts 351 may be conformally arranged with respect to the center of the moving unit 330.

Referring to FIGS. 2, 4A, and 4B, in the disclosure, the guide shaft 351 is provided as four guide shafts; however, the disclosure is not limited thereto and it may be variously modified such as being provided as two, three, five or more guide shafts.

The guide shaft 351 may be inserted and coupled to the buffer base 310 according to an embodiment of the disclosure, and at least one groove for insertion may be provided to correspond to at least one guide shaft 351.

Because the groove for insertion is formed in the buffer base 310, the guide shaft 351 may be prevented from being separated from the buffer base 310 and may be stably coupled to the buffer base 310.

The moving unit 330 according to an embodiment of the disclosure may move on the guide shaft 351.

The movement of the grip unit 100 may be restricted when the robot arm gripper device 1 according to an embodiment of the disclosure contacts or collides with a wall, a floor, foreign substances, or the like in an operation site in the process of approaching the object 5 to be gripped.

As the movement of the grip unit 100 is restricted, the grip unit 100 and the buffer unit 300 connected to the power transmission unit 200, particularly the moving unit 330, may be pressed, the moving unit 330 may move on the guide shaft 351 (the right side in FIG. 4A), and an impact applied to the grip unit 100 may be buffered (i.e., a buffering effect).

One side (the right side in FIG. 4A) of the guide shaft 351 according to an embodiment of the disclosure may be coupled to the buffer base 310, and the other side thereof (the left side in FIG. 4A) facing the one side may be coupled to the shaft head 352.

Referring to FIGS. 1, 2, 4A, and 4B, the shaft head 352 according to an embodiment of the disclosure may be coupled to the guide shaft 351 and may be coupled to the other side facing one side of the guide shaft 351 coupled to the buffer base 310.

The area of the cross-section of the shaft head 352 with respect to the longitudinal axis (the horizontal direction in FIG. 4A) may be greater than the area of the hole portion formed in the moving unit 330.

Accordingly, the moving unit 330 may be prevented from being separated from the buffer body 350, particularly the guide shaft 351.

Referring to FIGS. 1, 2, 4A, and 4B, the third elastic member 353 according to an embodiment of the disclosure may be arranged between the buffer base 310 and the moving unit 330 and may be formed of an elastic material. The third elastic member 353 may be arranged outside the guide shaft 351.

The third elastic member 353 may have an elastic restoration force in the direction of the moving unit 330 (from right to left in FIG. 4A) in the buffer base 310.

Accordingly, when the movement of the grip unit 100 is restricted during the operation of the robot arm gripper device 1, the grip unit 100 may be pressed, the moving unit 330 connected to the grip unit 100 and the power transmission unit 200 may be pressed, and the third elastic member 353 may elastically support the moving unit 330 and may buffer an impact applied to the grip unit 100.

The third elastic member 353 according to an embodiment of the disclosure is formed of a coil spring; however, the disclosure is not limited thereto and it may be variously modified such as being arranged between the moving unit 330 and the buffer base 310, having an elastic restoration force, and elastically supporting the moving unit 330.

The buffer unit 300 according to an embodiment of the disclosure may be coupled to the robot arm body 10 to be rotatable with the longitudinal central axis of the robot arm body 10 as a rotational central axis in the clockwise or counterclockwise direction along the rotational central axis.

Although not illustrated in the drawings, the buffer unit 300 according to an embodiment of the disclosure may be variously modified such as being provided with a sensor unit (not illustrated) such as a torque or load cell sensor.

Figure 5A:
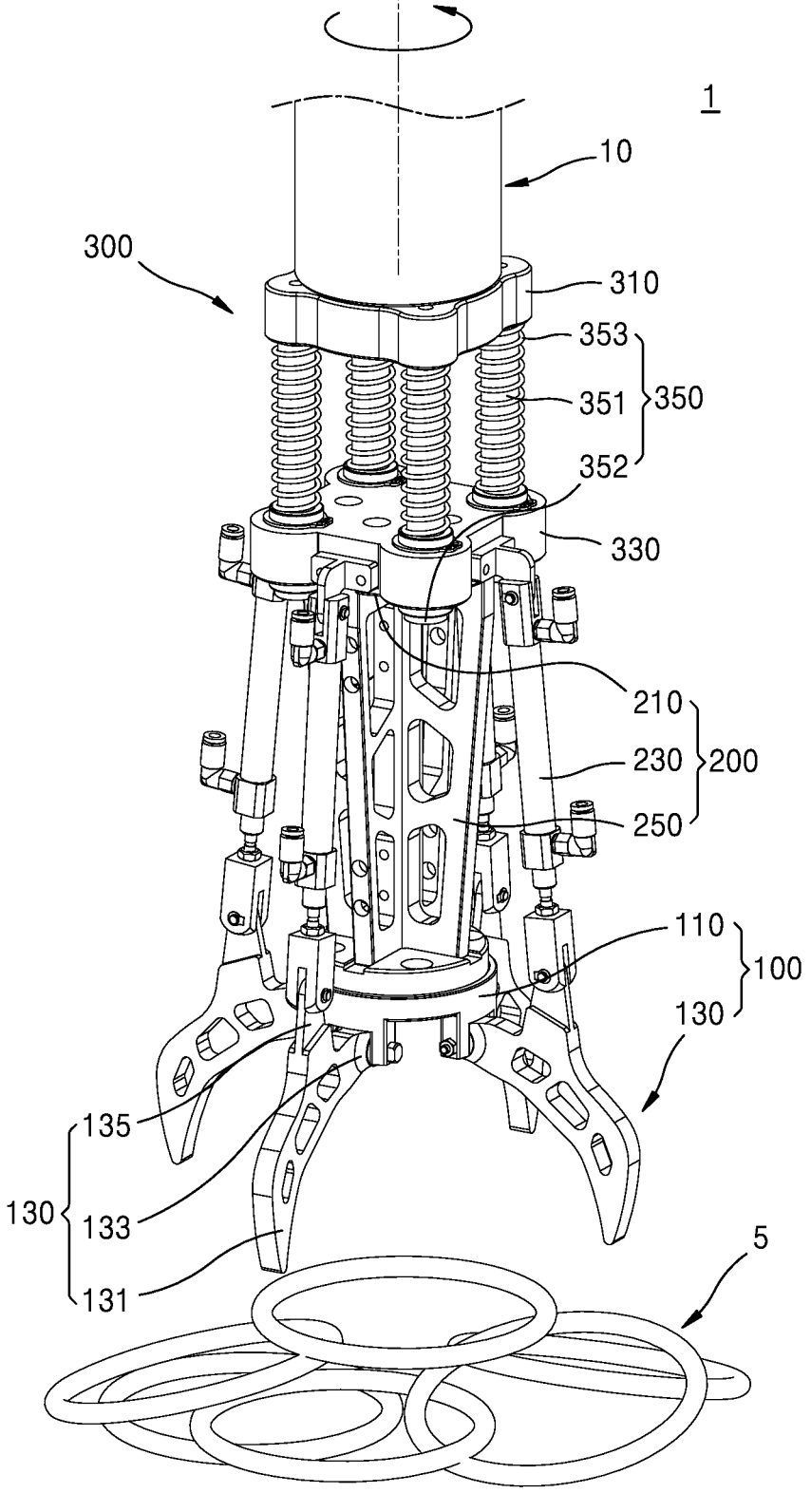
FIGS. 5A to 5C are diagrams illustrating the in-use state of a robot arm gripper device according to an embodiment of the disclosure.
Figure 5B:
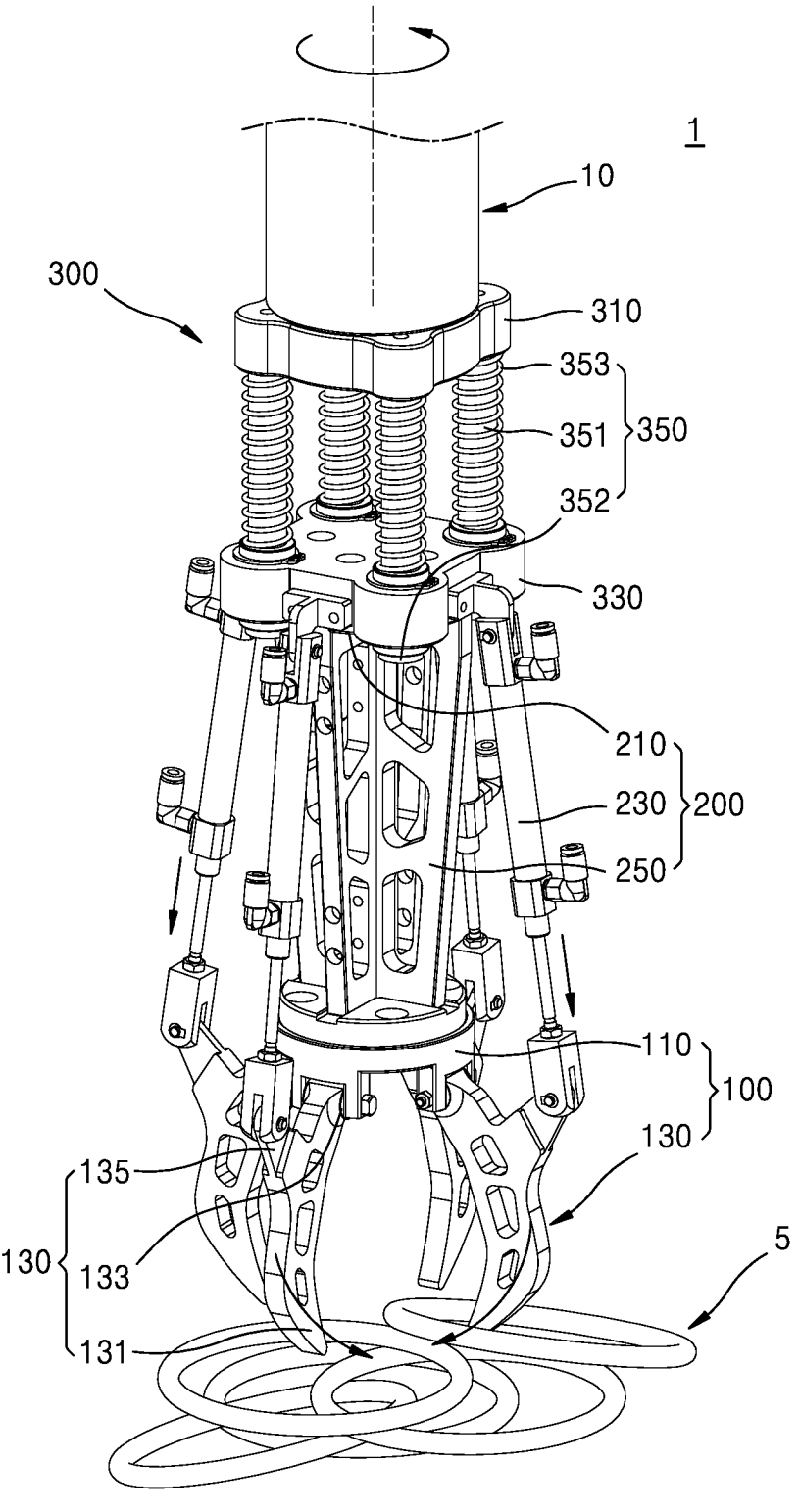
Figure 5C:
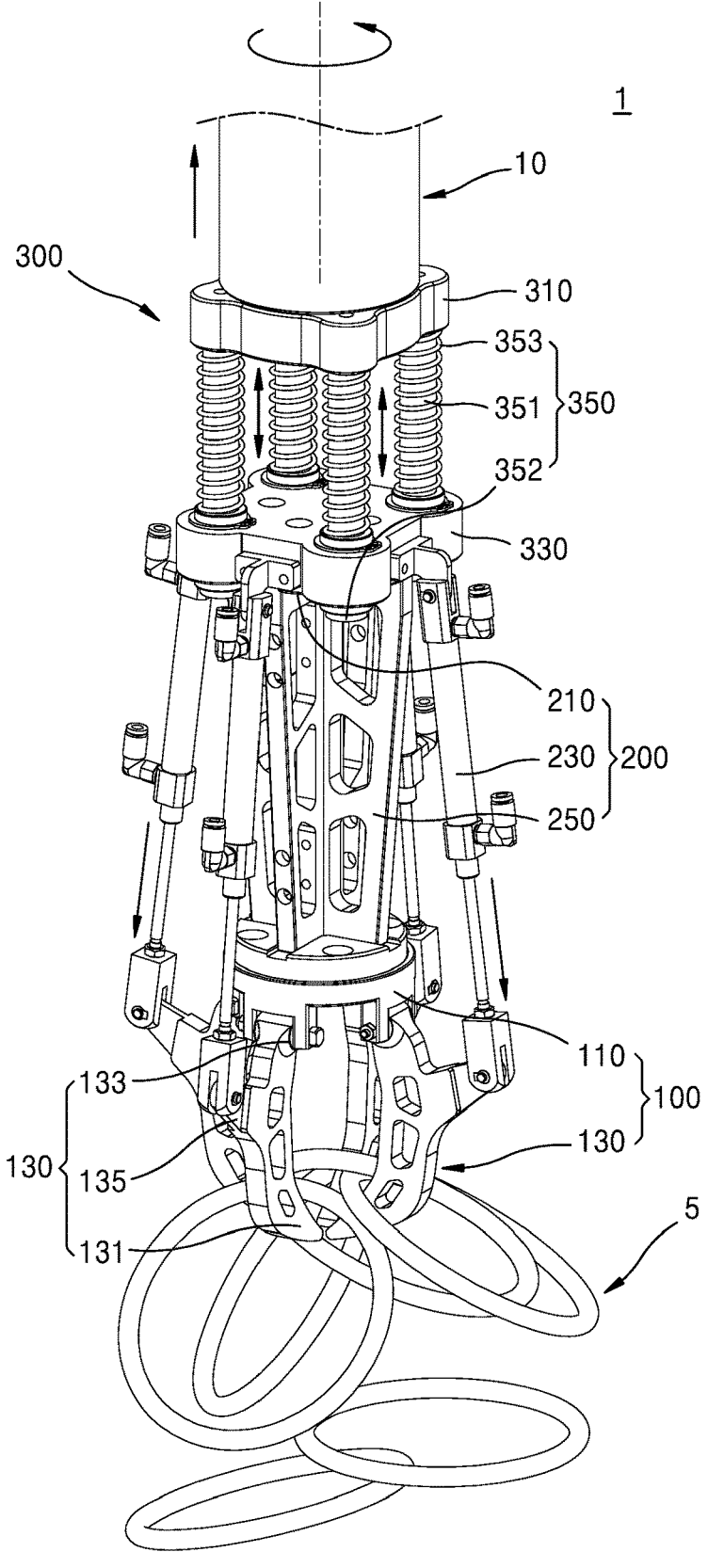

The operation principle and effect of the robot arm gripper device 1 according to an embodiment of the disclosure as above will be described below. FIGS. 5A to 5C are diagrams illustrating the in-use state of the robot arm gripper device 1 according to an embodiment of the disclosure.

Referring to FIGS. 1 to 5C, the robot arm gripper device 1 according to an embodiment of the disclosure may include a grip unit 100, a power transmission unit 200, and a buffer unit 300. The robot arm gripper device 1 may be coupled to the robot arm body 10.

Referring to FIG. 1, the buffer unit 300 may be coupled to the robot arm body 10, and the buffer unit 300 may be coupled to be rotatable in the clockwise or counterclockwise direction with the longitudinal central axis of the robot arm body 10 as a rotation center thereof.

Accordingly, by considering the arrangement situation of an atypical object 5 such as a processed part, an electronic part, or a ring-shaped bearing, the arrangement of at least one grip body 130 may be modified, and the object 5 may be efficiently gripped.

Referring to FIG. 1, the buffer unit 300, the power transmission unit 200, and the grip unit 100 may be coupled in a direction apart from the robot arm body 10.

Referring to FIG. 5A, the robot arm body 10 according to an embodiment of the disclosure may be moved to a place where the object 5 such as a ring-shaped bearing is located, and the robot arm gripper device 1 may be moved to a position where the grip unit 100 may grip the object 5.

Referring to FIG. 1, the grip unit 100 according to an embodiment of the disclosure may include a grip base 110 and a grip body 130, and at least one grip body 130 (130A, 130B, 130C, and 130D) may be hingeably coupled to the grip base 110.

A first connection unit 133 and a second connection unit 135 may be formed in each of a plurality of grip bodies 130A, 130B, 130C, and 130D, the first connection unit 133 may be connected to the grip base 110, and the second connection unit 135 may be connected to the power transmission unit 200, particularly, the driving unit 230.

A bent portion 131 may be formed on the other side facing one side of the grip body 130 connected to the grip base 110 and the driving unit 230, that is, in the grip body 130 facing the side of the object 5.

The bent portion 131 described above may be implemented in the basic shape of the grip body 130 or may be implemented in the shape of the grip shoe 150 added and coupled to the outside of the grip body 130 as illustrated in FIG. 3B.

Referring to FIG. 3B, the grip shoe 150 according to an embodiment of the disclosure may include a first shoe body 151 and a second shoe body 153, and the first shoe body 151 and the second shoe body 153 may be separately formed in a symmetrical structure and fastened to the grip body 130.

A fastening member may fasten the first shoe body 151 and the second shoe body 153 in the same way as a general bolt and nut, and the material, rigidity, and shape of the grip shoe 150 may be variously manufactured and attached according to the material of the object 5.

Accordingly, in addition to at least one grip body 130 gripping the object 5, an atypical object 5 such as a ring-shaped bearing may be caught on the grip body 130 itself.

Referring to FIGS. 1 to 3A, the grip body 130 may receive power from the power transmission unit 200.

The power transmission unit 200 according to an embodiment of the disclosure, particularly the driving unit 230, may be formed by a hydraulic or pneumatic cylinder method and may be adjusted in length by receiving a hydraulic pressure or a pneumatic pressure from the outside.

Referring to FIGS. 1 and 5A to 5C, when the driving unit 230 is lengthened, the second connection unit 135 formed in the grip body 130 may be pushed toward the object 5, and as the second connection unit 135 is moved toward the object 5, the grip body 130 may be rotated with a connection portion of the first connection unit 133 and the grip base 110 as a rotational central axis.

In other words, the linear movement of the driving unit 230 may be converted into the hinge movement of the grip body 130, and a ring-shaped object 5 may be gripped as the grip body 130 is rotated.

A support unit 250 having a preset length may be installed between the grip unit 100 and the power transmission unit 200, particularly the power transmission base 210, and the linear movement section of the driving unit 230 may be secured due to the support unit 250.

In addition, because the support unit 250 is coupled to each of the grip unit 100, particularly the grip base 110, and the power transmission unit 200, particularly the power transmission base 210, the grip unit 100 and the power transmission unit 200 may be stably supported.

Also, in FIG. 3A, an additional object holding device (not illustrated) such as additional gripping, adsorption, or electromagnet-type attachment may be additionally added to a center portion of the grip base 110 according to the type, shape, or material of the object.

Referring to FIGS. 4A, 4B, and 5C, one side of the buffer unit 300 according to an embodiment of the disclosure may be connected to the power transmission unit 200, and the other side thereof may be connected to the robot arm body 10.

The buffer unit 300 may include a buffer base 310, a moving unit 330, and a buffer body 350, and the buffer base 310 may be coupled to the robot arm body 10.

Referring to FIGS. 4A and 5A to 5C, the buffer body 350 may include a guide shaft 351, a shaft head 352, and a third elastic member 353. The guide shaft 351 may be formed to extend in the longitudinal direction and may be coupled to the buffer base 310.

The guide shaft 351 may be coupled through the moving unit 330 and the power transmission base 210 coupled to the moving unit 330, and the shaft head 352 may be coupled to one end portion of the guide shaft 351 having passed through the moving unit 330 and the power transmission base 210.

The size of the hole portion formed in the moving unit 330 and the power transmission base 210 may be relatively smaller than the cross-sectional area of the shaft head 352 in order to allow the guide shaft 351 to pass therethrough.

Accordingly, because the shaft head 352 is arranged on the moving path of a coupling structure of the power transmission base 210 and the moving unit 330 moving on the guide shaft 351 and the shaft head 352 is coupled to the guide shaft 351, the coupling structure of the power transmission base 210 and the moving unit 330 may be prevented from being separated from the guide shaft 351.

Referring to FIGS. 4A and 4B, the third elastic member 353 may be arranged between the buffer base 310 and the moving unit 330 and may have an elastic restoration force toward the moving unit 330 (from right to left in FIG. 4A) in the buffer base 310.

Accordingly, when the grip unit 100 contacts an atypical object 5 or is unexpectedly pressed by an abrupt foreign substance or surrounding terrain in the operation environment, the moving unit 330 may move toward the buffer base 310 along the guide shaft 351.

Because the third elastic member 353 may be compressed as the moving unit 330 moves and the third elastic member 353 may have an elastic restoration force in a direction apart from the buffer base 310, an impact may be buffered in a situation where the grip unit 100 is pressed.

Because the third elastic member 353 may instantaneously absorb an impact abruptly applied to the grip unit 100 and the grip unit 100 may be again moved by the elastic restoration force in the direction away from the buffer base 310, a buffering effect may be achieved and the grip unit 100 may be prevented from being damaged.

The impact absorption by the buffer unit 300 according to an embodiment of the disclosure may reduce a direct physical impact applied to the object 5 by the grip unit 100 and may also buffer an impact applied to the robot arm body 10 due to a collision with the object 5.

Hereinafter, the configuration, operation principle, and effect of a robot arm gripper device according to another embodiment of the disclosure will be described.

Figure 6:
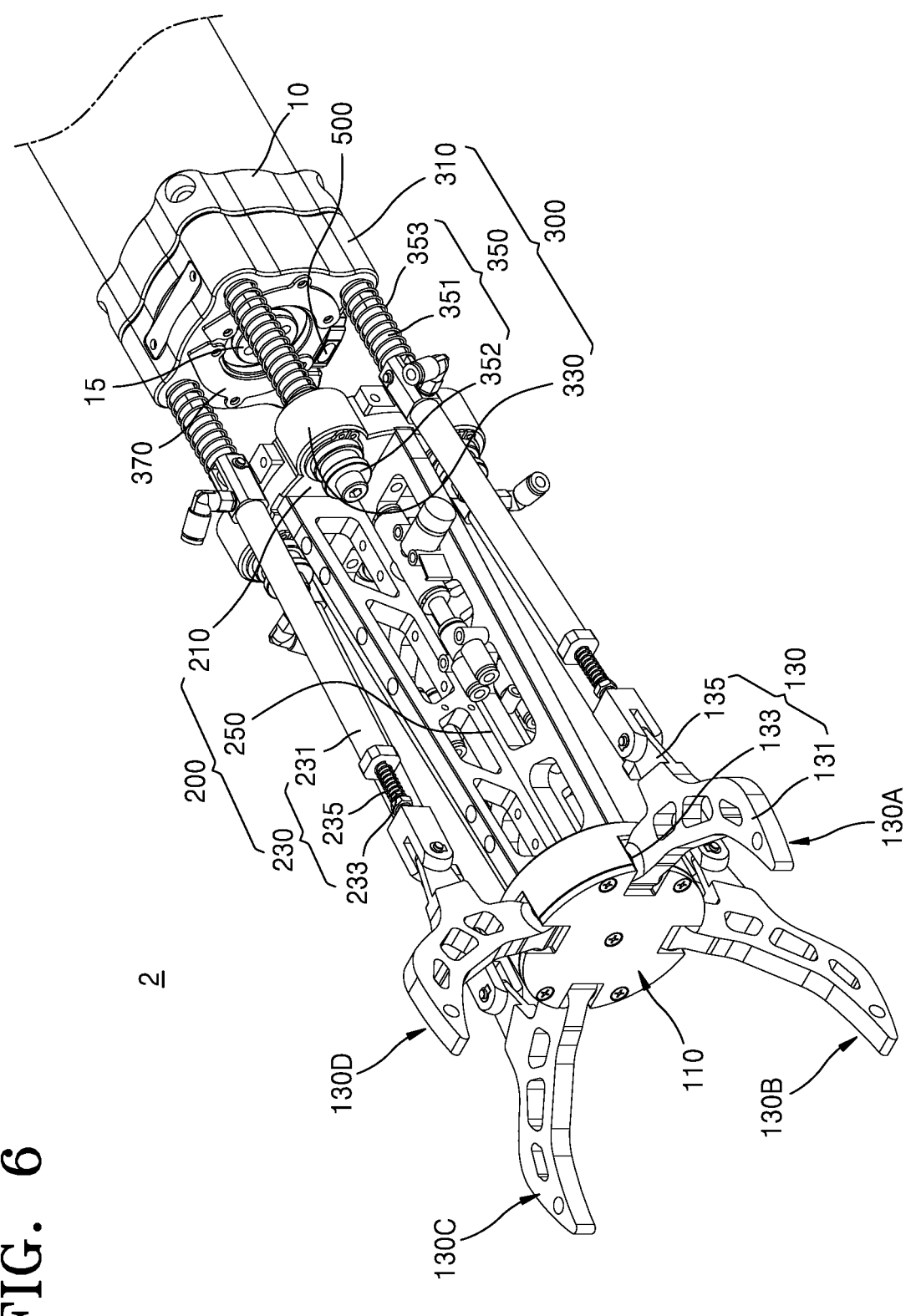
FIG. 6 is a perspective view illustrating a robot arm gripper device according to another embodiment of the disclosure.
Figure 7:
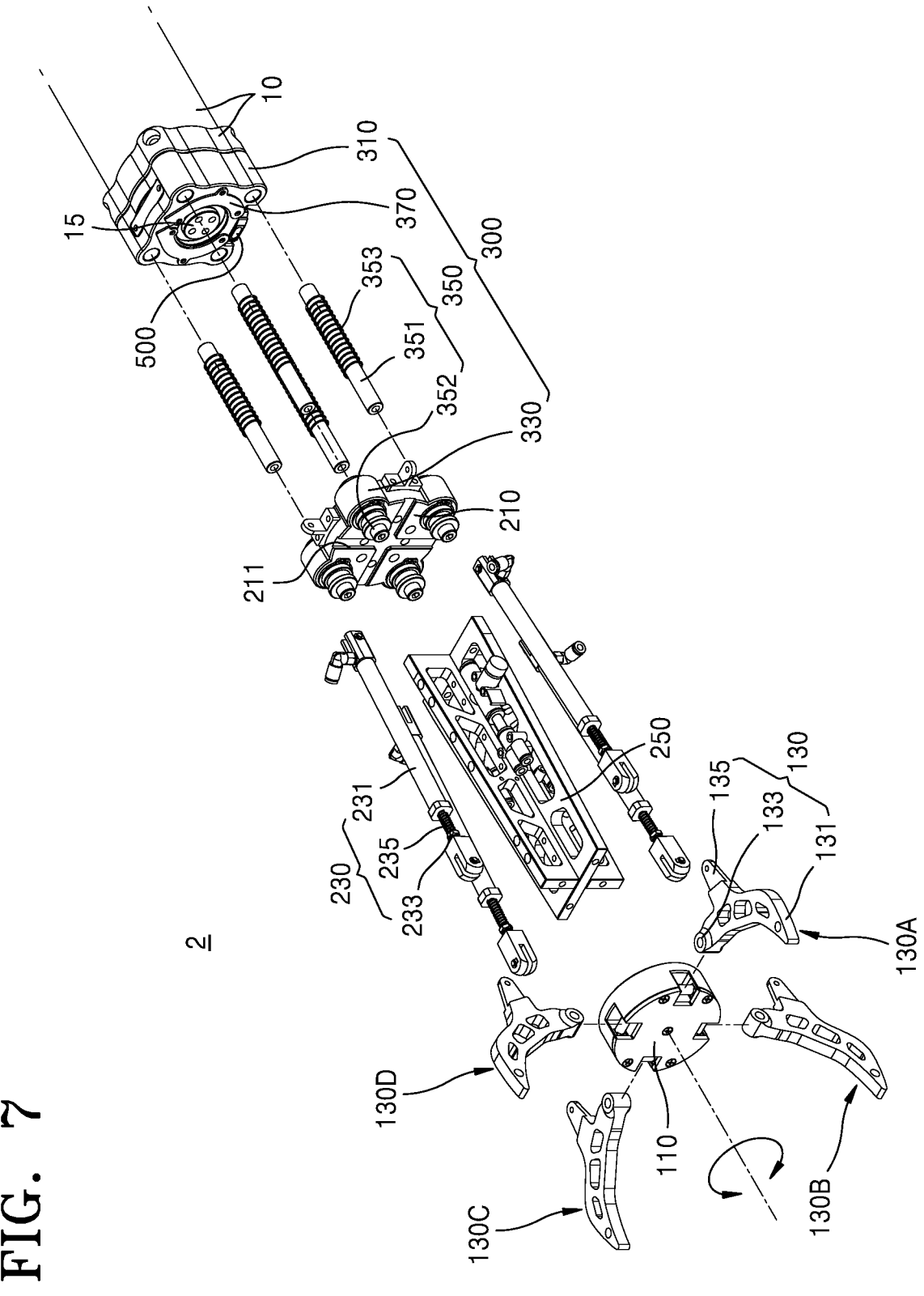
FIG. 7 is an exploded view illustrating a robot arm gripper device according to another embodiment of the disclosure.
Figure 8:
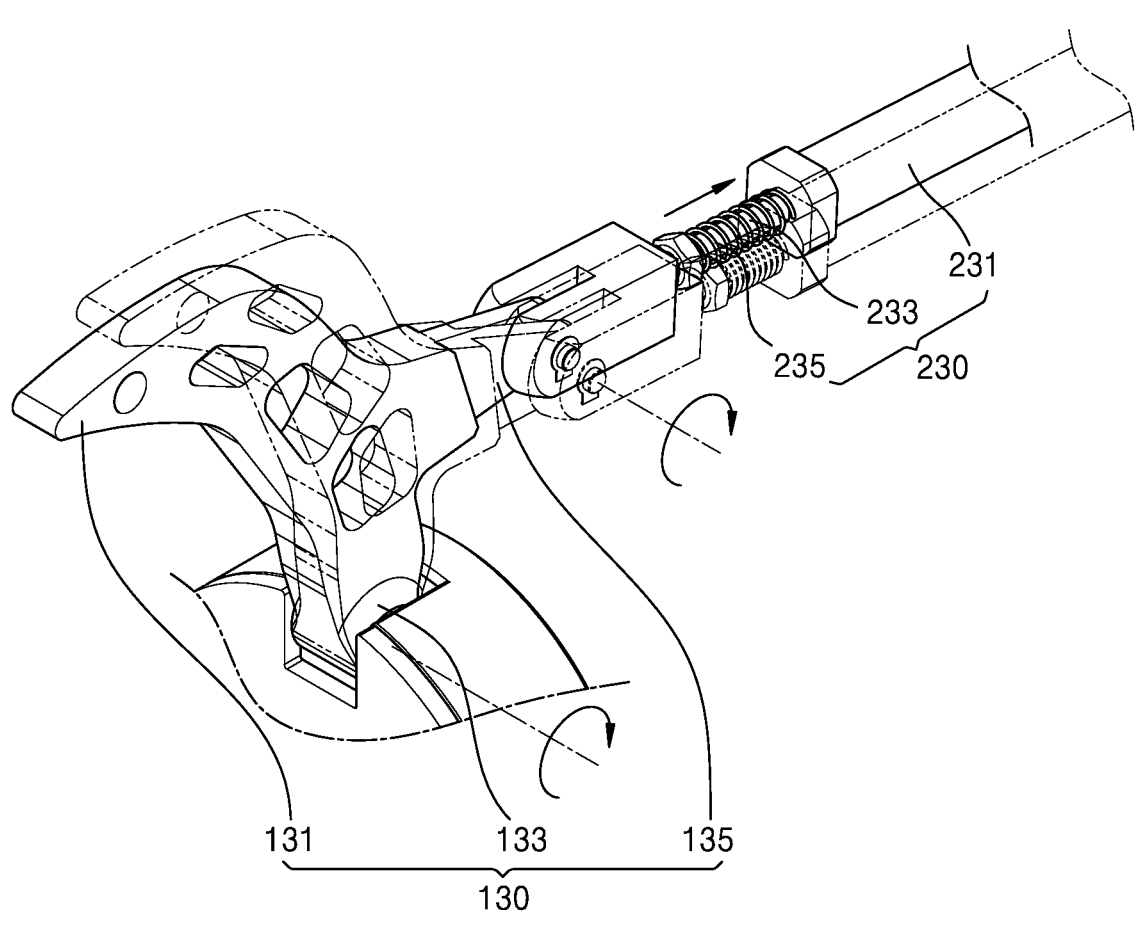
FIG. 8 is an enlarged view of a portion of FIG. 6.
Figure 9:
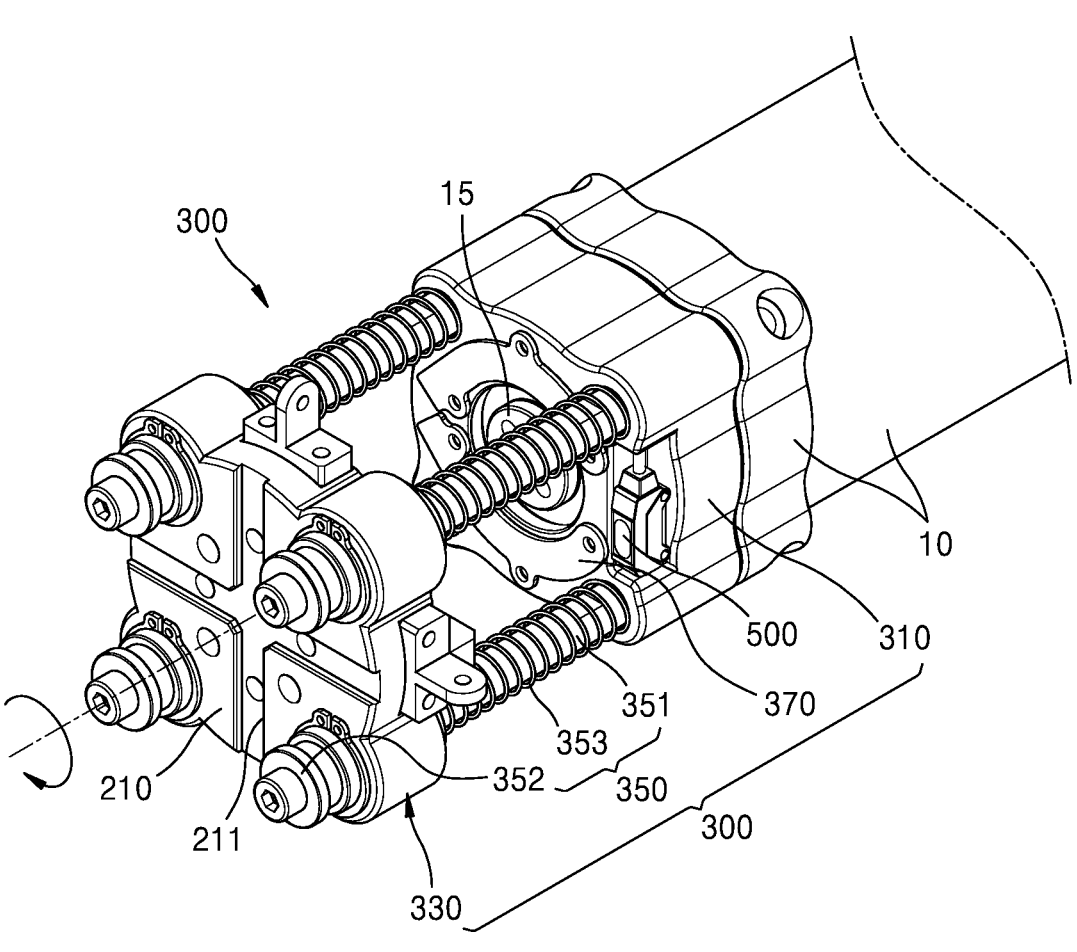
FIG. 9 is a perspective view illustrating a buffer unit according to another embodiment of the disclosure.
Figure 10:
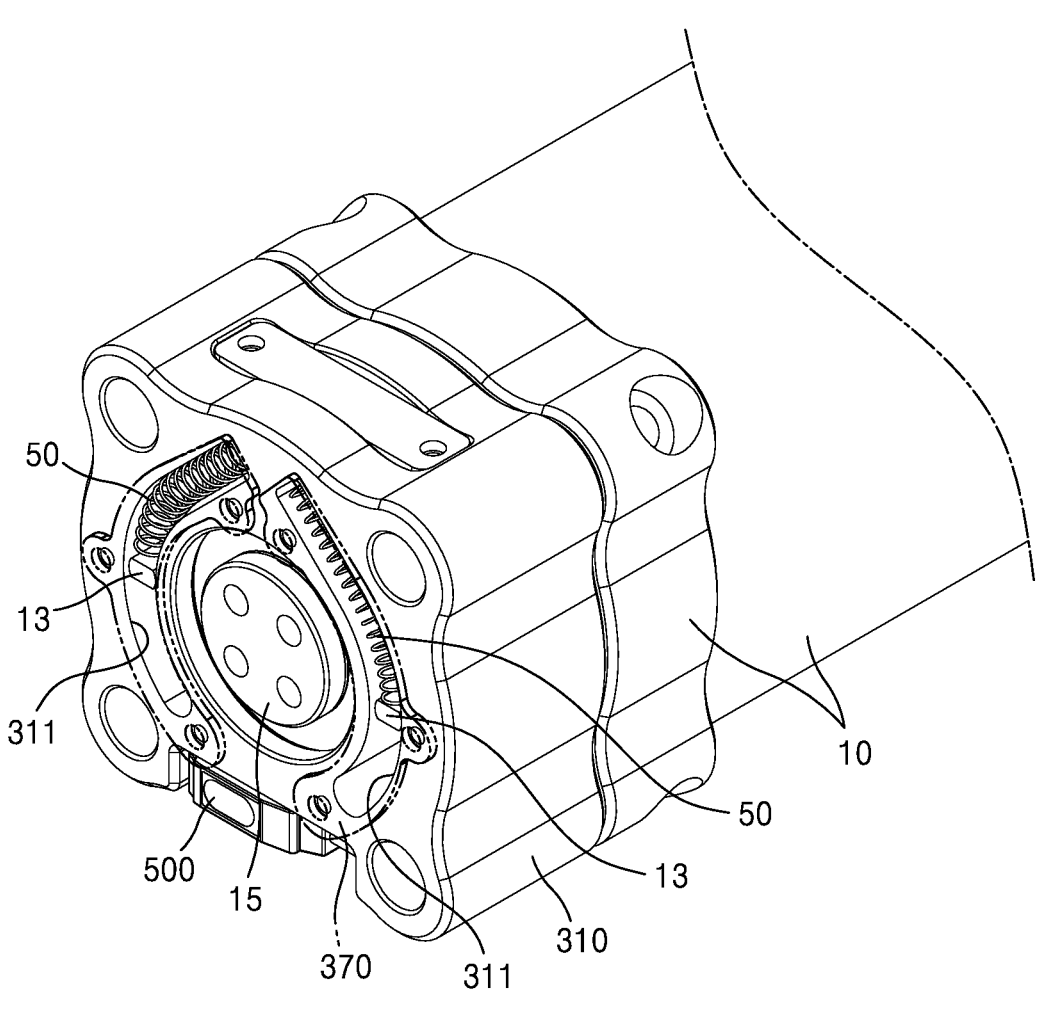
FIG. 10 is a perspective view illustrating a buffer base according to another embodiment of the disclosure.
Figure 11:
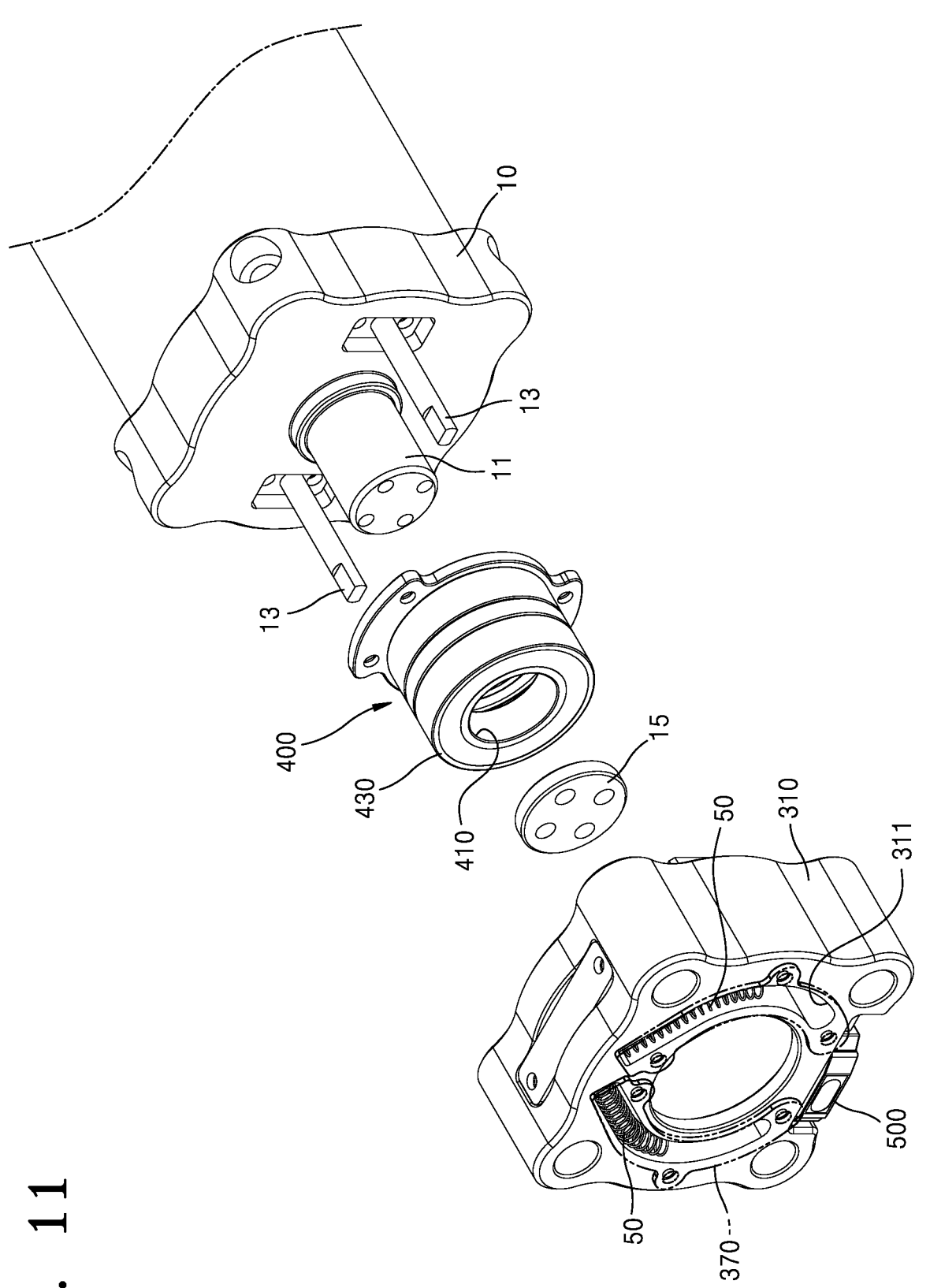
FIG. 11 is an exploded view illustrating a buffer base, a robot arm body, and a bearing unit according to another embodiment of the disclosure.
Figure 12:
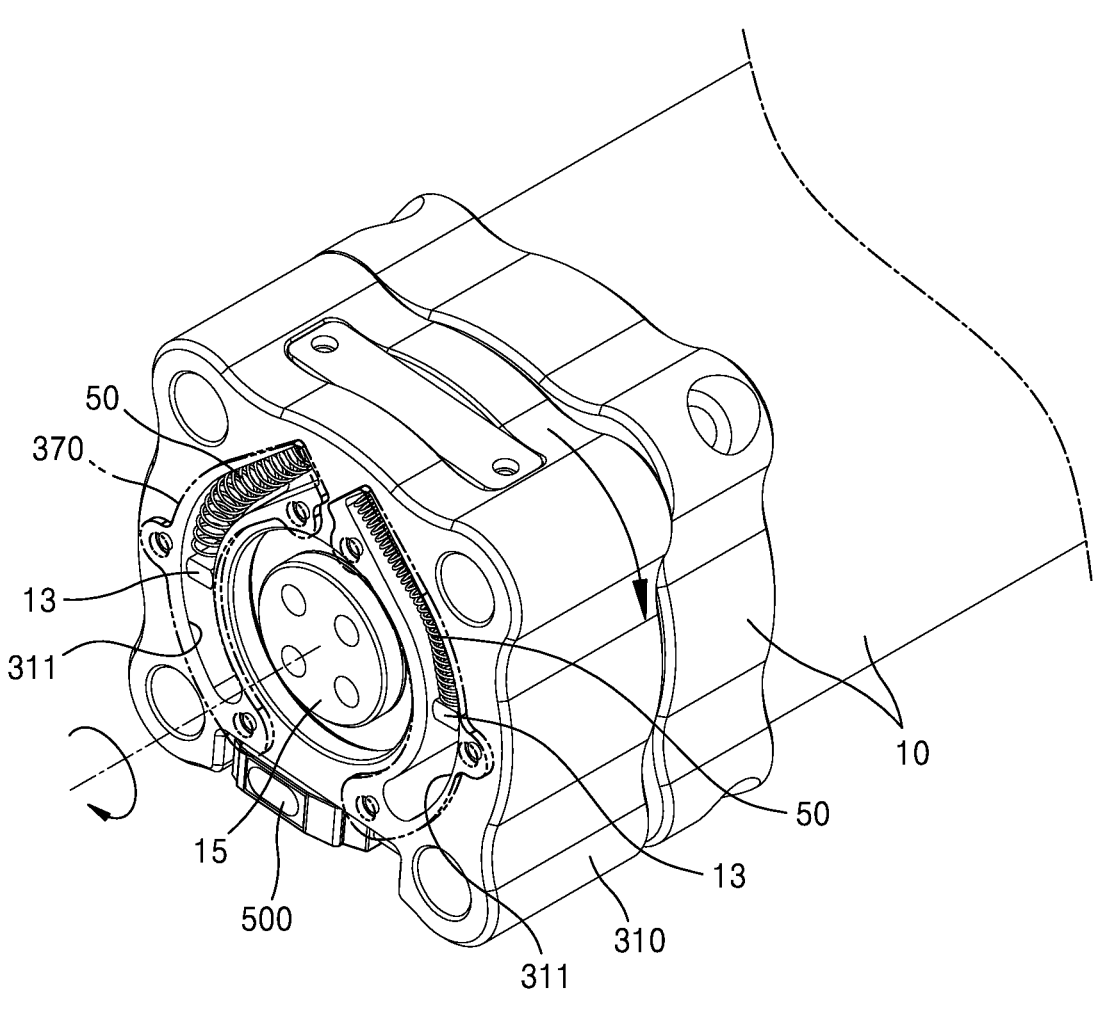
FIG. 12 illustrates a state in which a buffer base is rotated with respect to a robot arm body in FIG. 10.
Figure 13:
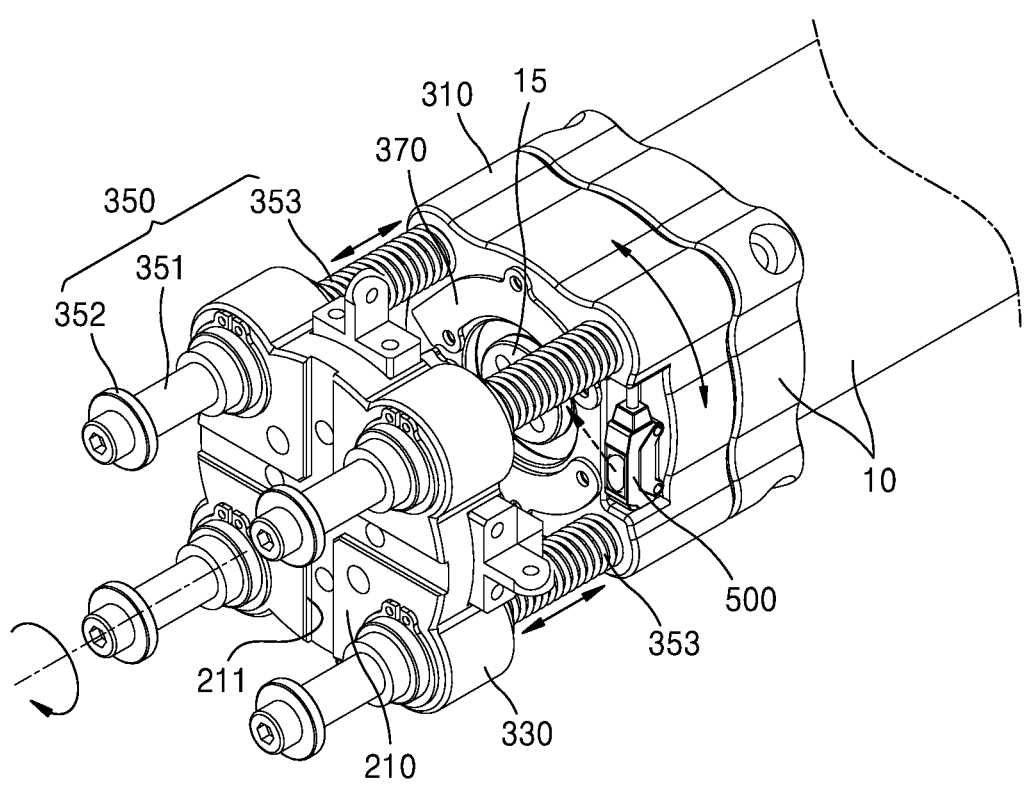
FIG. 13 is a perspective view illustrating a sensor unit according to another embodiment of the disclosure.
Figure 14A:
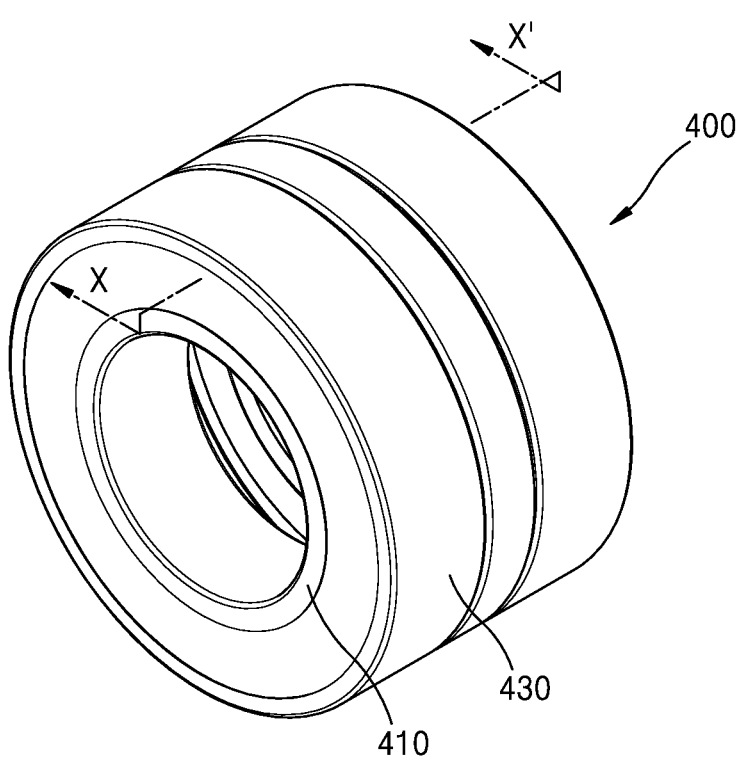
FIG. 14A is a perspective view illustrating a bearing unit according to another embodiment of the disclosure.
Figure 14B:
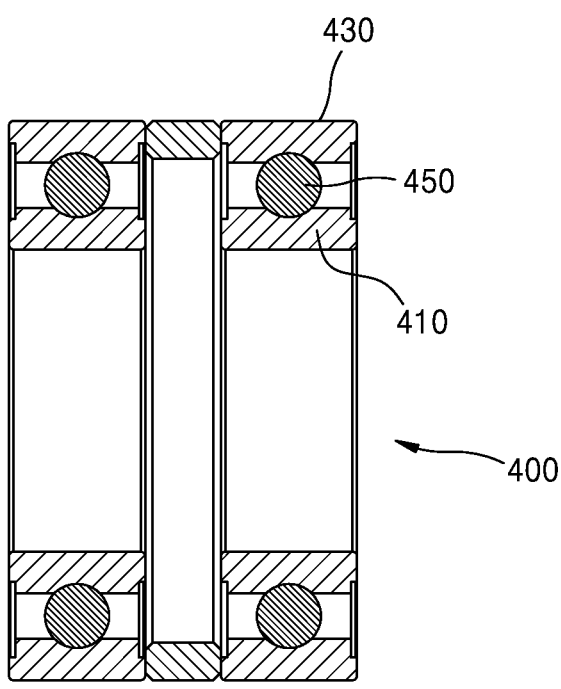
FIG. 14B is a front cross-sectional view taken along line X-X' of FIG. 14A.

FIG. 6 is a perspective view illustrating a robot arm gripper device according to another embodiment of the disclosure. FIG. 7 is an exploded view illustrating a robot arm gripper device according to another embodiment of the disclosure. FIG. 8 is an enlarged view of a portion of FIG. 6. FIG. 9 is a perspective view illustrating a buffer unit according to another embodiment of the disclosure. FIG. 10 is a perspective view illustrating a buffer base according to another embodiment of the disclosure. FIG. 11 is an exploded view illustrating a buffer base, a robot arm body, and a bearing unit according to another embodiment of the disclosure. FIG. 12 illustrates a state in which a buffer base is rotated with respect to a robot arm body in FIG. 10. FIG. 13 is a perspective view illustrating a sensor unit according to another embodiment of the disclosure. FIG. 14A is a perspective view illustrating a bearing unit according to another embodiment of the disclosure. FIG. 14B is a front cross-sectional view taken along line X-X' of FIG. 14A.

Referring to FIGS. 6 to 14B, a robot arm gripper device 2 according to another embodiment of the disclosure may include a robot arm body 10, a grip unit 100, a power transmission unit 200, a buffer unit 300, a bearing unit 400, and a sensor unit 500.

Referring to FIGS. 6, 7, and 9 to 13, the robot arm body 10 may be driven and moved by receiving power from the outside, and a buffer base 310 may be coupled to be relatively rotatable with respect to the robot arm body 10.

Referring to FIGS. 10 and 12, the buffer unit 300 according to another embodiment of the disclosure, particularly the buffer base 310, may be coupled to be rotatable in the clockwise or counterclockwise direction with respect to the robot arm body 10 with the longitudinal central axis of the robot arm body 10 as a rotational central axis.

Referring to FIG. 11, the robot arm body 10 according to another embodiment of the disclosure may share a central axis with the buffer base 310, and an arm shaft 11 may be formed to protrude with the central axis as the longitudinal direction.

Referring to FIG. 11, the arm shaft 11 may be inserted through the buffer base 310, and the bearing unit 400 described below may be arranged between the arm shaft 11 and the buffer base 310.

Referring to FIG. 11, the outer circumferential surface of the arm shaft 11 may be connected to the bearing unit 400, particularly a bearing inner surface 410, and a bearing outer surface 430 may be connected to the inner surface of the buffer base 310.

Accordingly, the relative rotation between the buffer unit 300, particularly the buffer base 310, and the arm shaft 11, may be smoothly performed, and the arm shaft 11 corresponding to the rotational central axis of the buffer base 310 may be stably supported.

Referring to FIGS. 10 to 12, a pillar portion 13 may be formed to protrude from the robot arm body 10 according to another embodiment of the disclosure. The pillar portion 13 may be fixed to the robot arm body 10 and may be formed to protrude and extend from the robot arm body 10 toward the buffer unit 300, particularly the buffer base 310.

The pillar portion 13 protruding from the robot arm body 10 according to another embodiment of the disclosure may be movable inside the buffer base 310 and may push a first elastic member 50.

The pillar portion 13 according to embodiments of the disclosure may be provided as a plurality of pillar portions and a pair of pillar portions may be provided in the disclosure; however, the disclosure is not limited thereto and it may be variously modified such as being provided as three or more pillars.

Referring to FIG. 11, a plurality of pillars 13 may be conformally arranged with respect to the center of the robot arm body 10.

A plurality of rotation guide grooves 311 may be formed in the buffer base 310 to correspond to the plurality of pillars 13, and a plurality of first elastic members 50 may be arranged between the plurality of rotation guide grooves 311 and the pillar portion 13.

Referring to FIGS. 10 to 12, the pillar portion 13 may be arranged inside the rotation guide groove 311 formed in the buffer base 310 and may be relatively movable inside the rotation guide groove when the buffer base 310 rotates relatively with respect to the robot arm body 10.

Referring to FIGS. 10 to 12, the first elastic member 50 described below may be arranged between the pillar portion 13 and the buffer base 310, particularly the rotation guide groove 311. One side of the first elastic member 50 may be connected to the inner surface of the rotation guide groove 311, and the other side thereof facing the one side may be connected to the pillar portion 13.

Accordingly, referring to FIG. 12, when the buffer base 310 is relatively rotated by an impact applied from the outside with respect to the robot arm body 10 fixed in position, the position of the pillar portion 13 in the rotation guide groove 311 may be changed and the first elastic member 50 may be compressed.

Referring to FIG. 12, a state in which the buffer base 310 is rotated in the clockwise direction (in FIG. 12) around the rotational central axis with respect to the robot arm body 10 is illustrated; however, unlike this, the first elastic member 50 may be lengthened when the buffer base 310 rotates in the counterclockwise direction around the rotational central axis due to an impact applied from the outside.

Due to the elastic restoration force of the first elastic member 50, the buffer base 310 may return to the normal position after rotating relatively with respect to the robot arm body 10.

Referring to FIG. 12, when the buffer base 310 rotates in the clockwise direction with respect to the robot arm body 10, the first elastic member 50 may be compressed and then rotated by the elastic restoration force in the counterclockwise direction and may return to the normal position.

On the contrary, when the buffer base 310 rotates in the counterclockwise direction with respect to the robot arm body 10, the first elastic member 50 may be compressed and then rotated by the elastic restoration force in the clockwise direction and may return to the normal position.

Due to the first elastic member 50 according to another embodiment of the disclosure, when an abrupt impact is applied from the object 5 in the site or the external environment in which the robot arm gripper device 2 is arranged, because the buffer base 310 is relatively rotated with respect to the robot arm body 10, an impact applied to the buffer unit 300, the power transmission unit 200 coupled thereto, and the grip unit 100 may be buffered.

In the disclosure, the first elastic member 50 is formed of a coil-shaped spring; however, the disclosure is not limited thereto and it may be variously modified within the scope of the technical concept of being arranged between the rotation guide groove 311 and the pillar portion 13 and having an elastic restoration force.

Referring to FIGS. 6, 7, and 10 to 12, the robot arm body 10 according to another embodiment of the disclosure may include a shaft cover. The shaft cover 15 may have a relatively greater diameter than the outer diameter of the arm shaft 11 and the inner diameter of the bearing inner surface 410 and may be coupled to the arm shaft 11.

Accordingly, the disconnection and separation between the bearing unit 400 and the arm shaft 11 may be prevented. In addition, the bearing unit 400, particularly the buffer base 310 connected to the bearing outer surface 430, may be prevented from being separated from the robot arm body 10.

Although not illustrated in the drawings, the shaft cover 15 and the arm shaft 11 may be fastened by a fastening member such as at least one bolt. Referring to FIG. 11, the shaft cover 15 is formed in a circular shape having a certain diameter; however, the disclosure is not limited thereto and it may be variously modified such as being formed in a polygonal shape within the scope of the technical concept of preventing the disconnection and separation between the bearing unit 400 and the arm shaft 11.

Referring to FIGS. 6 to 8, the power transmission unit 200 according to another embodiment of the disclosure may be coupled to the grip unit 100 and may transmit power to the grip unit 100. The power transmission unit 200 may include a power transmission base 210, a driving unit 230, and a support unit 250.

Except for the configuration of the driving unit 230, the power transmission base 210 and the support unit 250 of the power transmission unit 200 according to another embodiment of the disclosure may have the same configuration and effect as those of the power transmission unit 200 according to an embodiment of the disclosure, and thus, redundant descriptions thereof will be omitted for conciseness.

Referring to FIGS. 6 to 8, the driving unit 230 according to another embodiment of the disclosure may include a driving housing 231, a driving body 233, and a second elastic member 235.

Referring to FIGS. 6 to 8, the driving housing 231 may be coupled to the power transmission base 210 and may have a hollow inside, and the driving body 233 may be movably arranged inside the driving housing 231.

The driving body 233 may be movable inside the driving housing 231, may reciprocate in a preset movement direction, and may be coupled to the second connection unit 135 of the grip body 130.

As the driving body 233 moves inside the driving housing 231, the grip body 130 may be pushed, and the first connection unit 133 hingeably connected to the grip base 110 in the grip body 130 may be rotated.

Referring to FIGS. 6 to 8, the second elastic member 235 according to another embodiment of the disclosure may be arranged between the driving body 233 and the driving housing 231 and may elastically support the grip body 130. Accordingly, when the grip unit 100 receives an impact from the object 5 and the external environment, because the second elastic member 235 is instantaneously compressed, the driving body 233 may be movable in the driving housing 231 and an impact applied to the grip unit 100 may be buffered.

The second elastic member 235 according to another embodiment of the disclosure is formed in the shape of a coil spring; however, the disclosure is not limited thereto and it may be variously modified within the scope of the technical concept of elastically supporting the grip unit 100 and having an elastic restoration force.

The second elastic member 235 according to another embodiment of the disclosure may be arranged outside the driving body 233, one side thereof may be connected to the driving housing 231, and the other side thereof facing the one side may be connected to the driving body 233.

Accordingly, when an impact from the outside is instantaneously applied to the grip unit 100 connected to the driving body 233, particularly the grip body 130, the second elastic member 235 may be compressed to buffer the impact, and when the impact from the outside is removed, the driving body 233 may return to the normal position with respect to the driving housing 231 due to the elastic restoration force of the second elastic member 235.

Referring to FIGS. 10 to 12, the buffer unit 300 according to another embodiment of the disclosure may include one side connected to the power transmission unit 200 and the other side connected to the robot arm body 10 and may rotate relatively in the clockwise or counterclockwise direction with respect to the robot arm body 10 when an impact is instantaneously applied from the outside to the grip unit 100, the power transmission unit 200, and the buffer unit 300.

The buffer unit 300 according to another embodiment of the disclosure may include a buffer base 310, a moving unit 330, a buffer body 350, and a guide cover 370, and the moving unit 330 and the buffer body 350 may have the same configuration, operation principle, and effect as the buffer unit 300 according to an embodiment of the disclosure, and thus, redundant descriptions thereof will be omitted for conciseness.

Referring to FIGS. 10 to 12, the buffer base 310 according to another embodiment of the disclosure may be connected to the robot arm body 10 and may be rotatably coupled to the robot arm body 10 with the longitudinal central axis of the robot arm body 10 as a rotation center.

An opening may be formed on both sides in the longitudinal direction in a center portion of the buffer base 310, and the arm shaft 11 formed to protrude from the robot arm body 10 may be inserted through the center portion of the buffer base 310.

The bearing unit 400 may be arranged between the inner circumferential surface of the buffer base 310 according to another embodiment of the disclosure and the outer circumferential surface of the arm shaft 11 of the robot arm body 10, and particularly, the bearing outer surface 430 may be connected to the inner surface of the buffer base 310.

Referring to FIGS. 10 to 12, a rotation guide groove 311 may be formed in the buffer base 310 according to another embodiment of the disclosure. The rotation guide groove 311 may be an area into which the pillar portion 13 formed to protrude from the arm shaft 11 toward the buffer unit 300 is inserted.

Due to the formation of the rotation guide groove 311, when the pillar portion 13 is arranged inside the rotation guide groove 311 and the buffer unit 300, particularly the buffer base 310, rotates in the clockwise or counterclockwise direction with respect to the robot arm body 10, a rotation path of the buffer base 310 may be provided. That is, an impact may be absorbed while rotating in both directions from the default position, or an impact to the robot body may be buffered with respect to an external unpredicted torsion or rotational force that may occur during the movement of the robot.

A plurality of rotation guide grooves 311 may be provided corresponding to a plurality of pillar portions 13 and a plurality of first elastic members 50. Referring to FIGS. 10 to 12, the rotation guide groove 311 may be formed with a preset curvature radius with respect to the center of the buffer base 310. Thus, a rotation path of the buffer base 310 may be provided when the buffer base 310 rotates relatively with respect to the robot arm body 10.

The first elastic member 50 may be arranged between the inner surface of the rotation guide groove 311 and the pillar portion 13, the first elastic member 50 may be compressed as the distance between the pillar portion 13 and the inner surface of the rotation guide groove 311 contacting the first elastic member 50 decreases, and the first elastic member 50 may be extended as the distance between the pillar portion 13 and the inner surface of the rotation guide groove 311 increases.

In addition, because the first elastic member 50 compressed due to the elastic restoration force of the first elastic member 50 may have an elastic restoration force in the extension direction and the extended first elastic member 50 may have an elastic restoration force in the compression direction, the distance between the inner surface of the rotation guide groove 311 and the pillar portion 13 may return to have the normal position.

Referring to FIGS. 10 to 12, the guide cover 370 according to another embodiment of the disclosure may be coupled to the buffer base 310 and may cover the rotation guide groove 311. Because the guide cover 370 covers the rotation guide groove 311, the separation of the first elastic member 50 to the outside may be prevented.

In addition, because the guide cover 370 covers the rotation guide groove 311, foreign substances may be prevented from penetrating into the inside through the rotation guide groove 311, and the pillar portion 13, the buffer base 310, and the first elastic member 50 may be prevented from being damaged due to foreign substances.

Referring to FIGS. 11, 14A, and 14B, the bearing unit 400 according to another embodiment of the disclosure may be arranged between the arm shaft 11 and the inner surface of the buffer base 310 facing the arm shaft 11 and may include a bearing inner surface 410, a bearing outer surface 430, and a rolling portion 450.

The bearing inner surface 410 may be arranged inside the bearing outer surface 430 and may be arranged to face the arm shaft 11 of the robot arm body 10. The bearing outer surface 430 may be arranged outside the bearing inner surface 410 and may be arranged to face the inner circumferential surface of the buffer base 310.

Referring to FIG. 14B, the rolling portion 450 may be arranged between the bearing inner surface 410 and the bearing outer surface 430 and may allow relative rotation between the bearing inner surface 410 and the bearing outer surface 430. The rolling portion 450 may be formed in a ball shape, and a plurality of rolling portions 450 may be conformally arranged with respect to the center of the bearing outer surface 430.

In the disclosure, the bearing outer surface 430 is connected to the inner circumferential surface of the buffer base 310 and the bearing inner surface 410 is connected to the outer circumferential surface of the arm shaft 11; however, the disclosure is not limited thereto and it may be variously modified within the scope of the technical concept of being simply arranged between the inner circumferential surfaces of the buffer base 310 and the outer circumferential surface of the arm shaft 11 and allowing smooth rotation of the buffer base 310 with respect to the robot arm body 10. For example, a compression spring or tension spring method may be easily described with reference to the drawings of the above embodiment for buffering of an impact in the rotational direction, rotation for impact absorption, or returning to the initial position.

Also, for the same elastic returning, a leaf spring, a spiral spring, or the like may be applied.

Also, the magnitude of the elastic force set with respect to the elastic members for the elastic returning may be adjustable.

For example, in the case of a compression spring, a plurality of contact portions may be located such that the position of at least one end portion of the spring may be adjusted to adjust the distance between both end portions of the spring.

Also, by arranging a threaded connection unit, the elastic force according to the adjustment of the initial distance of the tension or compression spring may be changed by rotation of the screw.

Referring to FIGS. 6, 7, 10, 11, and 12, the sensor unit 500 according to another embodiment of the disclosure may be installed in the buffer unit 300, particularly in the buffer base 310.

The sensor unit 500 may be seated and coupled in an installation groove (not assigned a reference numeral) formed in the buffer base 310 and may measure the elastic force of the buffer body 350. The sensor unit 500 may include a photo sensor.

Referring to FIG. 12, the sensor unit 500 according to another embodiment of the disclosure may measure the displacement of the buffer body 350, particularly the third elastic member 353 and may measure the value of the elastic force of the third elastic member 353 based on the measured displacement difference.

Accordingly, when the displacement difference exceeds a preset value when the third elastic member 353 is compressed due to an impact from the outside, the sensor unit 500 may generate a danger signal and transmit the same to a controller (not illustrated) of the robot arm gripper device 2.

In this case, upon receiving the danger signal from the sensor unit 500, the controller may control the driving of the driving unit 230 to move the robot arm body 10 and the grip unit 100, the power transmission unit 200, and the buffer unit 300 coupled thereto when a force exceeding the elastic threshold value of the third elastic member 353 is received and to prevent the robot arm gripper device 2 from being damaged due to an external impact. In the above-described manners, the controller may directly or indirectly control the robot arm body 10, the grip unit 100, the power transmission unit 200, the driving unit 230, and the buffer unit. The controller may include at least one processor such as a microprocessor executing one or more software modules, programs or codes for performing the above-described functions and operations.

The sensor unit 500 according to another embodiment of the disclosure may include a photo sensor, and the detailed configuration and operation principle of the photo sensor are known in the art and thus redundant descriptions thereof will be omitted for conciseness.

In the robot arm gripper device 2 according to another embodiment of the disclosure, the arm shaft 11 and the pillar portion 13 are formed to protrude from the robot arm body 10, and the rotation guide groove 311 is formed in the buffer base 310, and except for the configuration of the first elastic member 50 arranged between the inner surface of the rotation guide groove 311 and the pillar portion 13, the configuration of the second elastic member 235 arranged between the driving housing 231 and the driving body 233, and the configurations of the guide cover 370 covering the rotation guide groove 311, the bearing unit 400, and the sensor unit 500, it may have the same configuration, operation principle, and effect as the grip unit 100, the power transmission base 210, the support unit 250, the moving unit 330, and the buffer body 350 of the robot arm gripper device 1 according to an embodiment of the disclosure, and thus, redundant descriptions thereof will be omitted for conciseness.

Although the disclosure has been described with reference to the embodiments illustrated in the drawings, this is merely an example and those of ordinary skill in the art will understand that various modifications may be made therein. Thus, the spirit and scope of the disclosure should be defined by the appended claims.

INDUSTRIAL APPLICABILITY

The disclosure may be used in the industry that manufactures or uses a robotic arm gripper device.

The invention claimed is:

1. A robot arm gripper device comprising:
a robot arm body;
a grip unit capable of gripping an object by a hinge movement;
a power transmission unit coupled to the grip unit and transmitting power to the grip unit; and
a buffer unit having one side connected to the power transmission unit and another side connected to the robot arm body,
wherein the power transmission unit is movable on the buffer unit,
wherein the buffer unit includes:
a buffer base connected to the robot arm body;
a moving unit coupled to the power transmission unit and capable of reciprocating in a direction of the buffer base; and
a buffer body arranged between the buffer base and the moving unit and elastically supporting the moving unit, and wherein the buffer unit is rotatably coupled to the robot arm body with a longitudinal central axis of the robot arm body as a rotational center.

2. The robot arm gripper device of claim 1, wherein the grip unit includes:
   a grip base coupled to the power transmission unit and fixed in position; and
   a grip body hingeably connected to the grip base by receiving power from the power transmission unit.

3. The robot arm gripper device of claim 2, wherein the grip body includes at least one bent portion on another side facing one side connected to the grip base.

4. The robot arm gripper device of claim 2, wherein the grip body includes a first connection unit hinge-coupled to the grip base and a second connection unit arranged apart from the first connection unit and rotating the grip body by receiving power from the power transmission unit.

5. The robot arm gripper device of claim 2, wherein the grip unit further includes a grip shoe attached to the grip body.

6. The robot arm gripper device of claim 2, wherein the power transmission unit includes:
   a power transmission base arranged to face the grip base and movable on the buffer unit; and
   a driving unit coupled to each of the power transmission base and the grip body and adjustable in length.

7. The robot arm gripper device of claim 6, wherein the driving unit is adjusted in length by a hydraulic or pneumatic cylinder method and transmits power to the grip body.

8. The robot arm gripper device of claim 7, wherein the driving unit is hinge-coupled to the power transmission base.

9. The robot arm gripper device of claim 6, wherein the power transmission unit further includes a support unit connecting the grip base and the power transmission base and contacting and supporting the grip base and the power transmission base.

10. The robot arm gripper device of claim 1, wherein the buffer body includes:
   a guide shaft coupled to the buffer base;
   a shaft head coupled to the guide shaft; and
   a third elastic member arranged between the buffer base and the moving unit.

11. A robot arm gripper device comprising:
   a robot arm body;
   a grip unit capable of gripping an object by a hinge movement;
   a power transmission unit coupled to the grip unit and transmitting power to the grip unit; and
   a buffer unit having one side connected to the power transmission unit and another side connected to the robot arm body,
   wherein the buffer unit is capable of relative rotation with respect to the robot arm body, the buffer unit includes a buffer base connected to the robot arm body, and
   wherein the buffer base is relatively rotatably coupled to the robot arm body with a longitudinal central axis of the robot arm body as a rotational center, and includes a first elastic member arranged between the buffer base and the robot arm body and having an elastic restoration force.

12. The robot arm gripper device of claim 11, wherein the buffer unit further includes:
   a moving unit coupled to the power transmission unit and capable of reciprocating in a direction of the buffer base; and
   a buffer body arranged between the buffer base and the moving unit and elastically supporting the moving unit.

13. The robot arm gripper device of claim 12, further comprising a sensor unit installed in the buffer unit and measuring an elastic force of the buffer body.

14. The robot arm gripper device of claim 11, further comprising a second elastic member arranged between the power transmission unit and the grip unit and elastically supporting the grip unit.

15. A robot arm gripper device comprising:
   a robot arm body;
   a grip unit capable of gripping an object by a hinge movement;
   a power transmission unit coupled to the grip unit and transmitting power to the grip unit; and
   a buffer unit having one side connected to the power transmission unit and another side connected to the robot arm body,
   wherein the power transmission unit is movable on the buffer unit,
   wherein the buffer unit includes:
      a buffer base connected to the robot arm body;
      a moving unit coupled to the power transmission unit and capable of reciprocating in a direction of the buffer base; and
      a buffer body arranged between the buffer base and the moving unit and elastically supporting the moving unit,
   wherein the grip unit includes:
      a grip base coupled to the power transmission unit and fixed in position; and
      a grip body hingeably connected to the grip base by receiving power from the power transmission unit, and
   wherein the power transmission unit includes:
      a power transmission base arranged to face the grip base and movable on the buffer unit; and
      a driving unit coupled to each of the power transmission base and the grip body and adjustable in length.

16. The robot arm gripper device of claim 15, wherein the grip body includes at least one bent portion on another side facing one side connected to the grip base.

17. The robot arm gripper device of claim 15, wherein the grip body includes a first connection unit hinge-coupled to the grip base and a second connection unit arranged apart from the first connection unit and rotating the grip body by receiving power from the power transmission unit.

18. The robot arm gripper device of claim 15, wherein the grip unit further includes a grip shoe attached to the grip body.

19. The robot arm gripper device of claim 15, wherein the driving unit is adjusted in length by a hydraulic or pneumatic cylinder method and transmits power to the grip body.

20. The robot arm gripper device of claim 15, wherein the driving unit is hinge-coupled to the power transmission base.

* * * * *